United States Patent [19]

Hayasaki

[11] Patent Number: 5,644,916
[45] Date of Patent: Jul. 8, 1997

[54] HYDRAULIC PRESSURE SUPPLY SYSTEM FOR VARIABLE TORQUE TRANSFER OF FOUR-WHEEL DRIVE VEHICLE

[75] Inventor: Koichi Hayasaki, Ebina, Japan

[73] Assignee: Nissan Motor Co., Ltd., Yokohama, Japan

[21] Appl. No.: 320,544

[22] Filed: Oct. 11, 1994

[30] Foreign Application Priority Data

Nov. 2, 1993 [JP] Japan .................. 5-274238
Nov. 30, 1993 [JP] Japan .................. 5-300666

[51] Int. Cl.⁶ ............................ F16D 31/02
[52] U.S. Cl. .................. 60/436; 60/437; 192/109 F
[58] Field of Search ............... 60/428, 437, 435, 60/436; 91/19, 33, 446, 28, 31, 32; 192/109 F; 180/247

[56] References Cited

U.S. PATENT DOCUMENTS

| | | | |
|---|---|---|---|
| 2,731,952 | 10/1956 | Szabo | 91/446 X |
| 3,135,168 | 6/1964 | Rutherford | 91/446 X |
| 3,188,916 | 6/1965 | Beatty | 91/446 X |
| 3,576,241 | 4/1971 | Maurice et al. | 91/31 X |
| 3,741,360 | 6/1973 | Patton | 60/428 X |
| 4,711,318 | 12/1987 | Kitade | 180/247 |
| 4,792,012 | 12/1988 | Morisawa et al. | 180/247 |
| 4,891,942 | 1/1990 | Schwarz | 60/436 |
| 4,915,189 | 4/1990 | Sakai | 180/247 |
| 4,915,190 | 4/1990 | Iwata | 180/247 |
| 5,010,974 | 4/1991 | Matsuda | 180/247 X |

FOREIGN PATENT DOCUMENTS

| | | | |
|---|---|---|---|
| 58-193907 | 11/1983 | Japan | 91/446 |
| 2-68225 | 3/1990 | Japan . | |

*Primary Examiner*—Hoang Nguyen
*Attorney, Agent, or Firm*—Foley & Lardner

[57] ABSTRACT

A hydraulic pressure supply system for a variable torque transfer of a four-wheel drive vehicle in which a driving-torque distribution ratio between front and rear road wheels is varied by adjusting a clutch pressure applied to a variable torque clutch assembled in said transfer, comprises an oil pressure source supplying a pressurized working fluid into a hydraulic line, at least one pressure regulating valve fluidly connected to the line for decreasingly regulating the pressurized working fluid at a predetermined clutch pressure, and a directional control valve fluidly connected to the pressure regulating valve for directing the clutch pressure to a transfer clutch. An electromagnetic solenoid valve is provided for controlling the pressure regulating valve and the directional control valve for selectively supplying one of a stand-by pressure and a clutch engaging pressure to the transfer clutch. The stand-by pressure is set to be slightly less than a predetermined pressure level at which the transfer clutch starts to engage.

16 Claims, 16 Drawing Sheets

FIG.11

|  | (a) | (b) | (c) |
|---|---|---|---|
| 1ST. VALVE 59 | ON | OFF | ON |
| 2ND. VALVE 60 | OFF | ON | ON |
| SUPPLIED PRESSURE TO CLUTCH 7 | Ps | Pc1' | Pc2 |
| $Ps < Pc1' < Pc2$ | | | |

HYDRAULIC PRESSURE SUPPLY SYSTEM FOR VARIABLE TORQUE TRANSFER OF FOUR-WHEEL DRIVE VEHICLE

BACKGROUND OF THE INVENTION

1. Field of the Invention

The present invention relates to a hydraulic pressure supply system for a variable torque transfer of a four-wheel drive vehicle, and specifically, to a hydraulic pressure supply system that can continuously control a value of hydraulic pressure fed to a variable torque transfer clutch of a four-wheel drive vehicle in response to a control command generated from a control unit, to variably adjust a distribution ratio of driving torque between front and rear road wheels.

2. Description of the Prior Art

Recently, there have been proposed and developed various four-wheel drive vehicles equipped with a variable torque transfer which can continuously adjust a distribution ratio of driving torque between front and rear road wheels by varying an engaging force of the transfer clutch. The four-wheel drive vehicle with a variable torque transfer also includes a hydraulic pressure supply system for the transfer, so as to variably adjust a clutch pressure fed to a transfer clutch. One such transfer clutch pressure supply system has been disclosed in Japanese Patent Provisional Publication (Tokkai Heisei) No. 2-68225, assigned by the same assignee as the present application, entitled "CONTROL DEVICE FOR ALLOCATION OF DRIVING FORCE FOR FOUR-WHEEL DRIVE VEHICLE". Such a prior art hydraulic pressure supply system for a variable torque transfer is often mounted in high-grade four-wheel drive vehicles, in order to perform a total control consisting of a front-and-rear wheel speed difference dependent traction control, a four wheel anti-skid brake control, and the like, respectively combined with a variable driving torque control of the transfer clutch. Referring now to FIG. 1, there is shown a four-wheel drive vehicle with a conventional hydraulic pressure supply system for a variable torque transfer as disclosed in the Japanese Patent Provisional Publication No. 2-68225. The four-wheel drive vehicle has an engine 1, a transmission 3a, a driving force transmission system 3, which system variably adjusts a distribution ratio of driving torque between front drive wheels 2FL and 2FR and rear drive wheels 2RL and 2RR, and a driving force distribution ratio control system 4. The conventional transfer clutch pressure supply system 5 included in the driving force distribution ratio control system is fluidly connected to a transfer clutch 7 such as a wet type multiple-disc clutch incorporated in a variable torque transfer 6 included in the driving force transmission system, to supply a controlled pressure to the transfer clutch. As shown in FIG. 2, the transfer clutch 7 usually includes a clutch drum 7a splined to the output shaft 17 of the transmission 3a, a plurality of friction plates 7b integrally connected to the clutch drum 7a, a clutch hub 7c rotatably supported on the outer periphery of the output shaft 17, a plurality of friction discs 7d integrally connected to the clutch hub 7c, a clutch piston 7e disposed in the right of the transfer clutch, and a cylinder chamber 7f defined between the clutch piston 7e and the clutch drum 7a. The inlet port 8 of the transfer 6 receives a controlled clutch pressure $P_C$ output from the hydraulic pressure supply system 5, with the result that the clutch piston 7e is pressurized to cause a relative displacement of the friction discs 7d to the friction plates 7b, and to force the friction discs 7d into frictional engagement with the friction plates 7b, and consequently to generate a desired engaging force of the clutch 7. In such a variable torque transfer 6, the front-and-rear wheel driving torque distribution ratio could be continuously controlled from a ratio of 0 : 100 to a ratio 50 : 50, depending on the magnitude of the controlled clutch pressure $P_C$. As seen in FIG. 2, the conventional pressure supply system 5 has an oil pump 5c, which pump has a driven connection with an electrical motor 5a to pressurize oil stored in an oil reservoir 16, a one-way check valve 5d fluidly connected to the discharge port of the pump 5c for preventing back flow of the discharged oil back to the pump, a pressure accumulator 5e fluidly disposed in an oil supply line between the inlet/outlet port 8 and the check valve 5d, and a proportional electromagnetic type pressure control valve 5f disposed in the oil supply line downstream of the accumulator 5e. A secondary oil pressure output from the pressure control valve 5f, i.e., the controlled clutch pressure $P_C$ is determined usually on the basis of a current value of a command current $I_{SOL}$ output from a control unit 9 included in the driving force distribution ratio control system 4 to a proportional solenoid 5g of the pressure control valve 5f. The control unit 9 is electrically connected to a front-left wheel speed sensor 10FL, a front-right wheel speed sensor 10FR, and a rear wheel speed sensor 10R disposed in the vicinity of a propeller shaft 10 mechanically connected to the rear differential, so as to receive wheel speed data of the respective road wheels. That is, in case the above-noted proportional electromagnetic type pressure control valve is used to produce a controlled clutch pressure, the clutch pressure $P_C$ would be adjusted in proportion to the current value of the command current $I_{SOL}$. The previously-noted front-and-rear wheel speed difference dependent traction control is effective to suppress acceleration-slip resulting from a change of vehicle driving state from a straight-ahead driving on high-friction road surface such as dry pavements to a rapid-acceleration driving or to a driving on low-friction road surface such as wet or icy roads. In case of a quick change of state from the greater-traction state to the less-traction state, a wheel speed detected by the rear-wheel speed sensor 10R becomes greater than a wheel speed detected by the respective front-wheel speed sensor 10FL and 10FR, owing to acceleration-slip experienced at the rear wheels 2RL and 2RR. In this case, the control unit 9 determines on the basis of the front-and-rear wheel speed difference that the acceleration-slip occurs at the rear wheels, and increasingly adjusts a value of command current $I_{SOL}$ to shift the transfer clutch 7 from a disengaged state to an engaged state by virtue of the hydraulic pressure supply system 5, thereby permitting a portion of driving torque to be applied to the rear wheels to be transmitted to the front wheels. In other words, when detecting acceleration-slip, the control unit 9 increasingly controls an engaging force of the transfer clutch 7 to shift from a two-wheel drive mode at which the driving torque can be transmitted from the transmission 3a only to the rear drive wheels 2RL and 2RR to a four-wheel drive mode at which the driving torque can be transmitted through the transfer 6 to the front wheels 2FL and 2FR as well as the rear wheels 2RL and 2RR. Thus, a driving stability could be enhanced by increasingly adjusting an engaging force of the transfer clutch.

On the other hand, the previously-noted four wheel anti-skid brake control is effective to suppress deceleration-slip experienced at rear wheels during quick braking. On quick braking, rear wheels tend to lock owing to a load shift from the rear road wheels to the front road wheels. To prevent the rear wheel lock, the control unit 9 increasingly controls the engaging force of the clutch 7 so as to permit a portion of braking torque to be applied to the rear wheels to be transmitted to the front wheels. Ordinarily, the control unit 9 determines the engaging force of the transfer clutch on the basis of an amount of engine braking, which amount is estimated by engine revolutions. In this manner, the braking balance between front and rear wheels, i.e., anti-skid characteristics would be remarkably improved.

However, in the total control according to which the variable torque control of the transfer clutch is performed in combination with the front-and-rear wheel speed difference dependent traction control, the four wheel anti-skid brake control or the like, when the controlled clutch pressure $P_C$ is gradually increased in response to the command from the control unit 9, there is a lag time until the transfer clutch 7 is shifted from its initial position wherein the friction plates 7b and the friction discs 7d are spaced apart from each other by a predetermined distance to its lightly engaging state wherein the friction discs 7d are brought into light contact with the friction plates 7b. The lag time is far from negligible. Owing to the lag time, the previously-noted prior art hydraulic pressure supply system 5 of a variable torque transfer would provide an insufficient responsiveness of the variable torque control of the transfer clutch.

SUMMARY OF THE INVENTION

Accordingly, it is an object of the invention to provide an improved hydraulic pressure supply system for a variable torque transfer of a four-wheel drive vehicle, which system avoids the foregoing disadvantages of the prior art.

It is another object of the invention to provide an improved hydraulic pressure supply system for a variable torque transfer of a four-wheel drive vehicle, which system is capable of continuously controlling a value of hydraulic pressure fed to the transfer clutch in response to a control command output by a control unit with a high response and a high accuracy, and ensuring a running stability of the vehicle even when an abnormality of a control unit arranged for the transfer-clutch pressure adjustment, for instance an electrical short-circuit of harnesses of the control unit or breaking of an exciting coil of an electromagnetic solenoid valve incorporated in the pressure supply system, is detected.

In order to accomplish the aforementioned and other objects of the invention, a hydraulic pressure supply system for a variable torque transfer of a four-wheel drive vehicle varies a driving-torque distribution ratio between front and rear road wheels by adjusting a clutch pressure applied to a variable torque clutch assembled in the transfer. The system comprises an oil pressure source supplying a pressurized working fluid into a hydraulic line, pressure regulating valve means fluidly connected to the line for decreasingly regulating the pressurized working fluid at a predetermined clutch pressure, directional control valve means fluidly connected to the pressure regulating valve means, for directing the clutch pressure to the clutch, and electromagnetic valve means controlling the pressure regulating valve means and the directional control valve means, for selectively supplying one of a stand-by pressure and a clutch engaging pressure to the clutch, the stand-by pressure being slightly less than a predetermined pressure level at which the clutch starts to engage and the clutch engaging pressure at which the clutch is engaged.

According to another aspect of the invention, a hydraulic pressure supply system for a variable torque transfer of a four-wheel drive vehicle brings a variable torque clutch assembled in the transfer into a predetermined clutch engaging state by application of a predetermined clutch pressure to the clutch to transfer a driving torque produced by a driving torque source to front and rear road wheels at a predetermined distribution ratio of the driving torque. The system comprises an oil pressure source supplying a pressurized working fluid into a hydraulic line, a first pressure regulating valve fluidly connected to the line, for decreasingly regulating the pressurized working fluid at a predetermined stand-by pressure slightly less than a predetermined pressure level at which the clutch starts to engage, a second pressure regulating valve fluidly connected to the line, and responsive to a first pilot pressure for decreasingly regulating the pressurized working fluid at a clutch engaging pressure at which the clutch is engaged, the clutch engaging pressure being variable at a predetermined proportional gain in accordance with an increase in the first pilot pressure, a directional control valve fluidly connected to the first and second pressure regulating valves, and responsive to the first pilot pressure and to a second pilot pressure for selectively supplying one of the stand-by pressure and the clutch engaging pressure to the clutch, a proportional electromagnetic pressure control valve for controlling the clutch engaging pressure in proportion to a pressure level of the first pilot pressure by applying the first pilot pressure to the second pressure regulating valve, and for shifting a valve position of the directional control valve, by application of the first pilot pressure thereto, to a first position at which the stand-by pressure is fed to the clutch, and an electromagnetic shut-off valve for shifting a valve position of the directional control valve, by application of the second pilot pressure thereto, to a second position at which the clutch engaging pressure is fed to the clutch.

According to a further aspect of the invention, a hydraulic pressure supply system for a variable torque transfer of a four-wheel drive vehicle brings a variable torque clutch assembled in the transfer into a predetermined clutch engaging state by application of a predetermined clutch pressure to the clutch to transfer a driving torque produced by a driving torque source to front and rear road wheels at a predetermined distribution ratio of the driving torque. The system comprises an oil pressure source supplying a pressurized working fluid into a hydraulic line, a pressure regulating valve fluidly connected to the line, and responsive to at least two pilot pressures for decreasingly regulating the pressurized working fluid in a stepwise manner so as to produce a predetermined stand-by pressure in case of application of a selected one of the pilot pressures thereto, and to produce a stepwisely variable clutch engaging pressure greater than the stand-by pressure depending on a combination of the pilot pressures applied to the pressure regulating valve, the stand-by pressure being slightly less than a predetermined pressure level at which the clutch starts to engage, the clutch engaging pressure being set at a predetermined pressure level at which the clutch is engaged, a directional control valve fluidly connected to the pressure regulating valve, for supplying the incoming fluid pressure regulated by the pressure regulating valve to the clutch by shifting its valve position to a full open position when receiving at least one of the pilot pressures, and at least two electromagnetic shut-off valves fluidly connected to the line and arranged in parallel to each other, for controlling the clutch engaging pressure at a desired pressure level and for controlling a valve position of the directional control valve, by changing a combination of the pilot pressures to be applied to both the pressure regulating valve and the directional control valve. The system may include a shuttle valve having two inlet ports respectively connected to the shut-off valves and a sole outlet port connected to the directional control valve, for supplying a higher one of the pilot pressures output from the respective shut-off valves through the shuttle valve to the directional control valve to shift the valve position of the directional control valve to the full open position.

According to a still further aspect of the invention, a hydraulic pressure supply system for a variable torque transfer of a four-wheel drive vehicle brings a variable torque clutch assembled in the transfer into a predetermined clutch engaging state by application of a predetermined clutch pressure to the clutch to transfer a driving torque produced by a driving torque source to front and rear road wheels at a predetermined distribution ratio of the driving torque. The system comprises a first reversible mechanical pump driven by an output shaft linked to the driving torque source for supplying a pressurized working fluid into a hydraulic line, a second electric motor-driven pump for supplying a pressurized working fluid into the line, a control unit generating a motor drive instruction for driving the second pump only when a fluid pressure produced by the first pump is less than a predetermined pressure level, a line pressure regulating valve fluidly connected to the line, for regulating the pressurized working fluid at a predetermined line pressure, a clutch pressure regulating valve fluidly disposed downstream of the line pressure regulating valve, for regulating the line pressure at a predetermined clutch pressure, a directional control valve fluidly disposed downstream of the clutch pressure regulating valve, for directing the clutch pressure from the pressure regulating valve to the clutch in the presence of a requirement of application of the clutch pressure, a duty-ratio controlled electromagnetic pressure control valve for controlling the clutch pressure depending on a predetermined duty ratio determined by the control unit, and an electromagnetic shut-off valve for controlling a valve position of the directional control valve in response to the requirement of application of the clutch pressure. The clutch pressure is adjusted in case of the duty ratio of 0% at a predetermined stand-by pressure slightly less than a predetermined pressure level at which the clutch starts to engage, and in case of the duty ratio of 100% at a highest possible clutch engaging pressure at which the clutch is engaged tightly. The clutch pressure is variable in proportion to the duty ratio. To ensure more precise control of the clutch pressure, it is preferable that the system includes a pilot valve fluidly downstream of the line pressure regulating valve for regulating the line pressure at a predetermined stable pilot pressure, and that the duty-ratio controlled electromagnetic pressure control valve receiving the stable pilot pressure as a primary pressure and adjusting the stable pilot pressure to the first pilot pressure which pressure is varied in proportion to the duty ratio. The clutch pressure regulating valve may comprise an internal-and-external pilot type pressure regulating valve having an internal pilot port receiving a secondary pressure of the clutch pressure regulating valve, an external-pilot port receiving the first pilot pressure, and a return spring, the secondary pressure fed to the internal pilot port acting in a reverse direction against the spring, and the first pilot pressure fed to the external pilot port acting in a same direction as a bias of the spring. The duty-ratio controlled electromagnetic pressure control valve preferably consists of a duty-ratio controlled 3-port, 2-position electromagnetic solenoid type pressure control valve having an inlet port, an outlet port and a drain port. ON and OFF states of a solenoid of the pressure control valve are cyclically repeated according to the duty ratio based on a time allocation of the ON state in which the inlet port and the outlet port are communicated with each other to the OFF state in which the inlet port and the drain port are communicated with each other.

The system may comprise an air bleed formed in a clutch drum of the clutch, and a residual-air capturing chamber defined between an annular stepped side wall section on a perimeter of a clutch piston of the clutch and an inner wall of the clutch drum. The residual-air capturing chamber being cooperative with the air bleed for extracting air contained in a working fluid present in a cylinder chamber of the clutch to atmosphere.

The system may include bypass passage means fluidly disposed between an oil reservoir and a port of the first pump which port communicates the line. The bypass passage means has a bypass line and a one-way check valve disposed in the bypass line, for supplying a working fluid from the reservoir through the bypass line and the check valve to a suction side of the first pump, only when a reverse rotation of the first pump produces a vacuum on the suction side.

BRIEF DESCRIPTION OF THE DRAWINGS

FIG. 11 is a table illustrating a control operation of the pressure supply system of the third embodiment.

DESCRIPTION OF THE PREFERRED EMBODIMENTS

First embodiment

Figure 1:
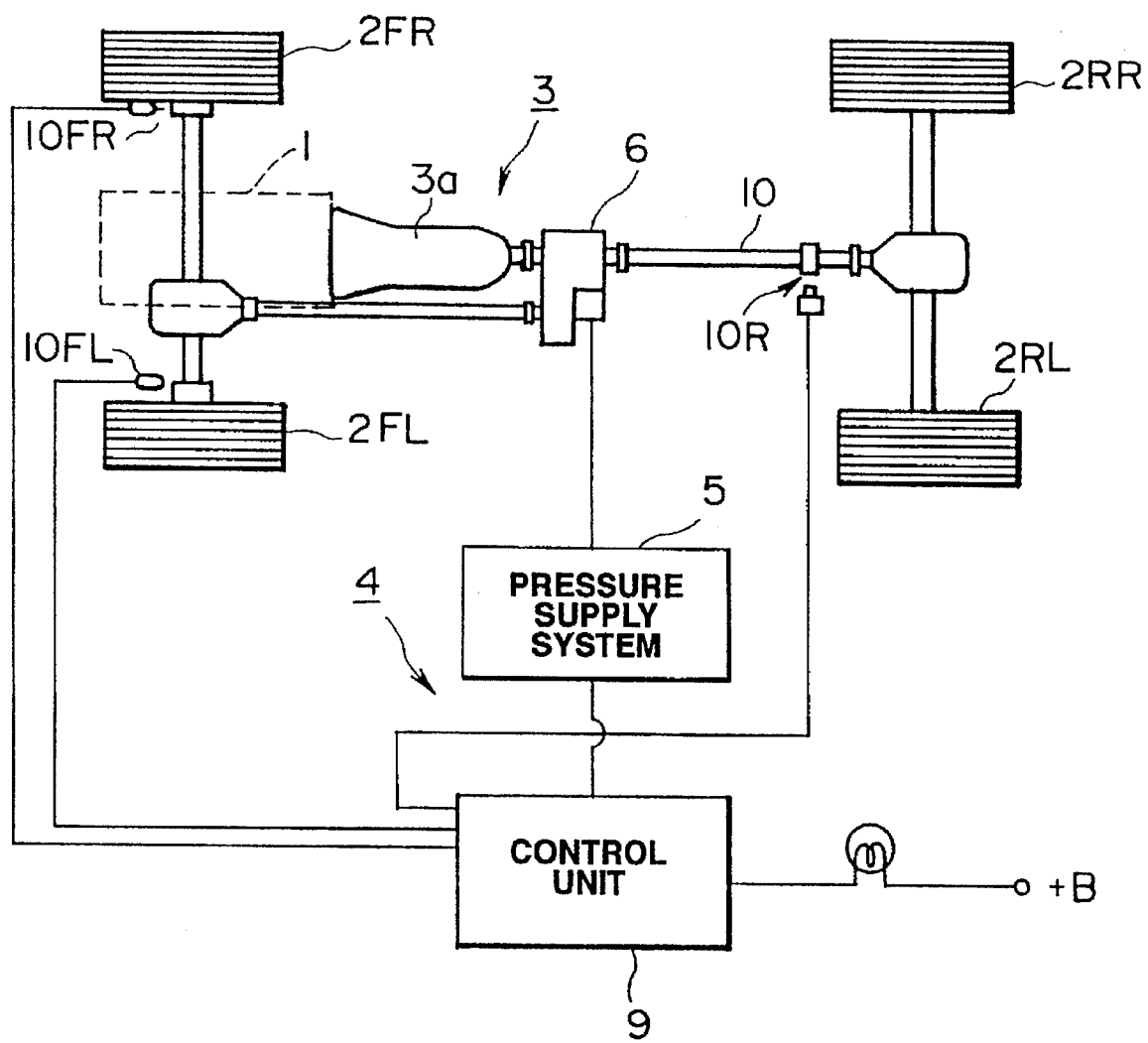
FIG. 1 is a schematic illustration of a four-wheel drive vehicle with a prior art hydraulic pressure supply system for a variable torque transfer.
Figure 2:
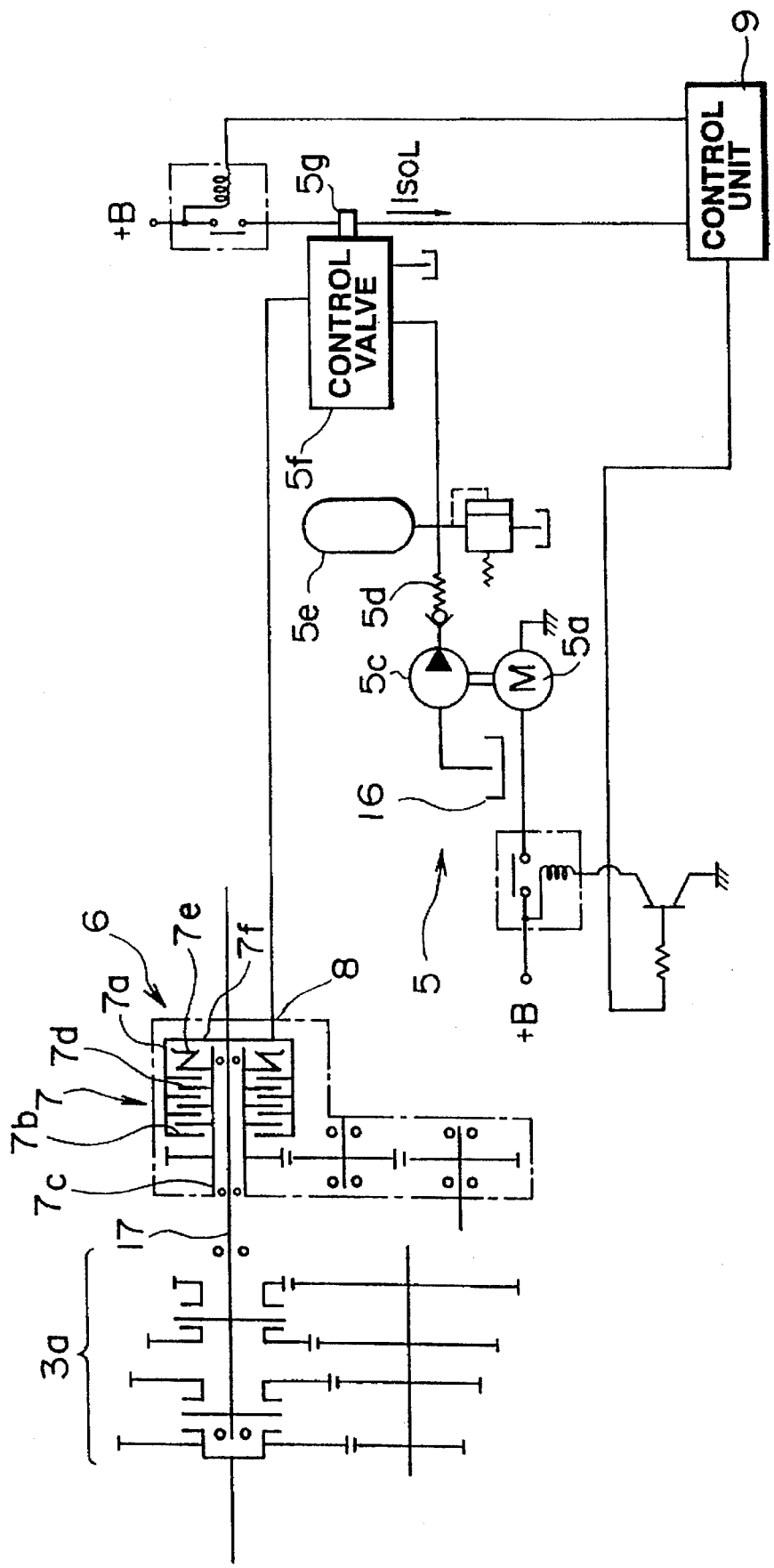
FIG. 2 is a block diagram illustrating the prior art hydraulic pressure supply system.
Figure 3:
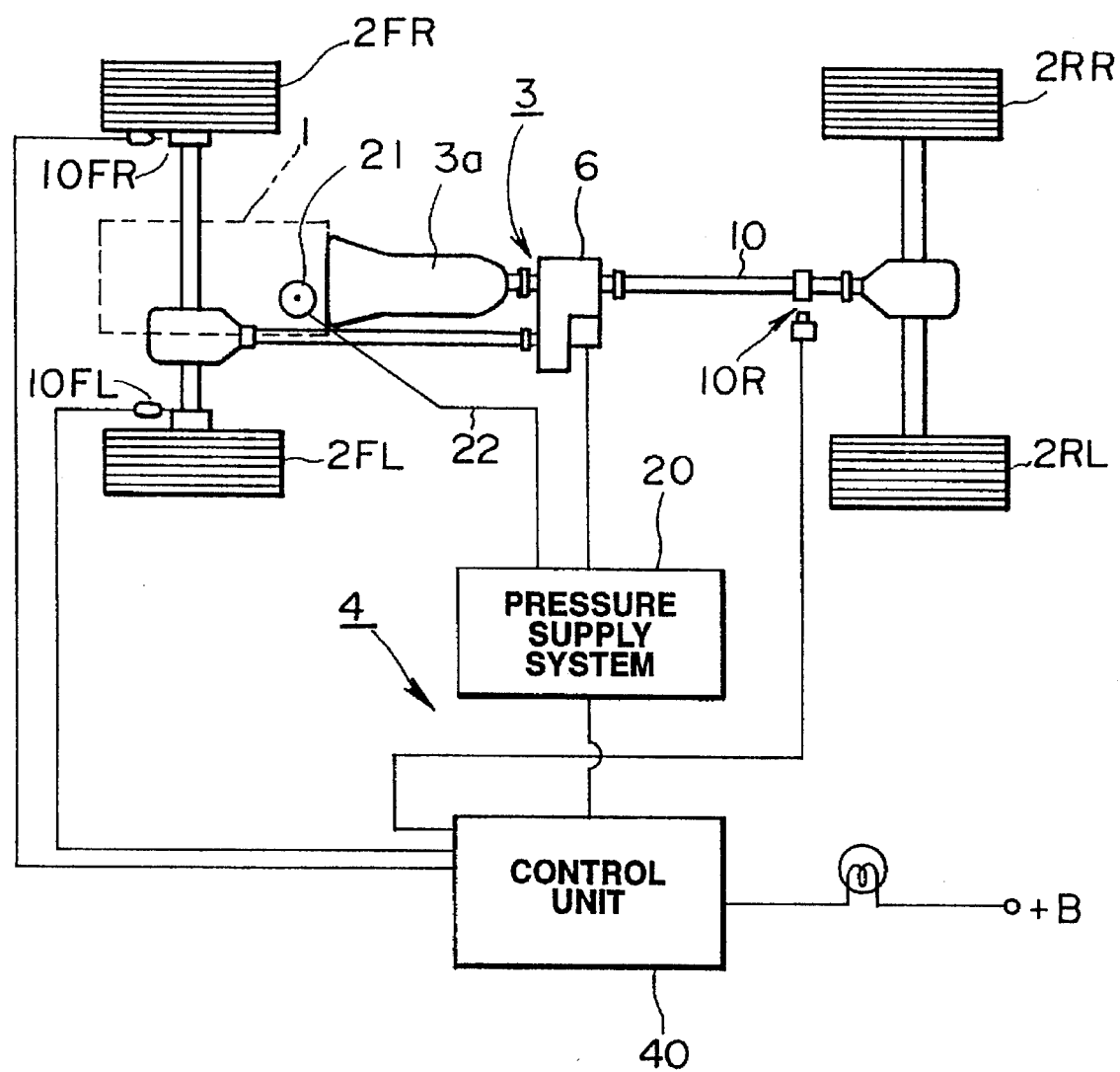
FIG. 3 is a schematic illustration of a four-wheel drive vehicle with a hydraulic pressure supply system for a variable torque transfer according to the present invention.
Figure 5:
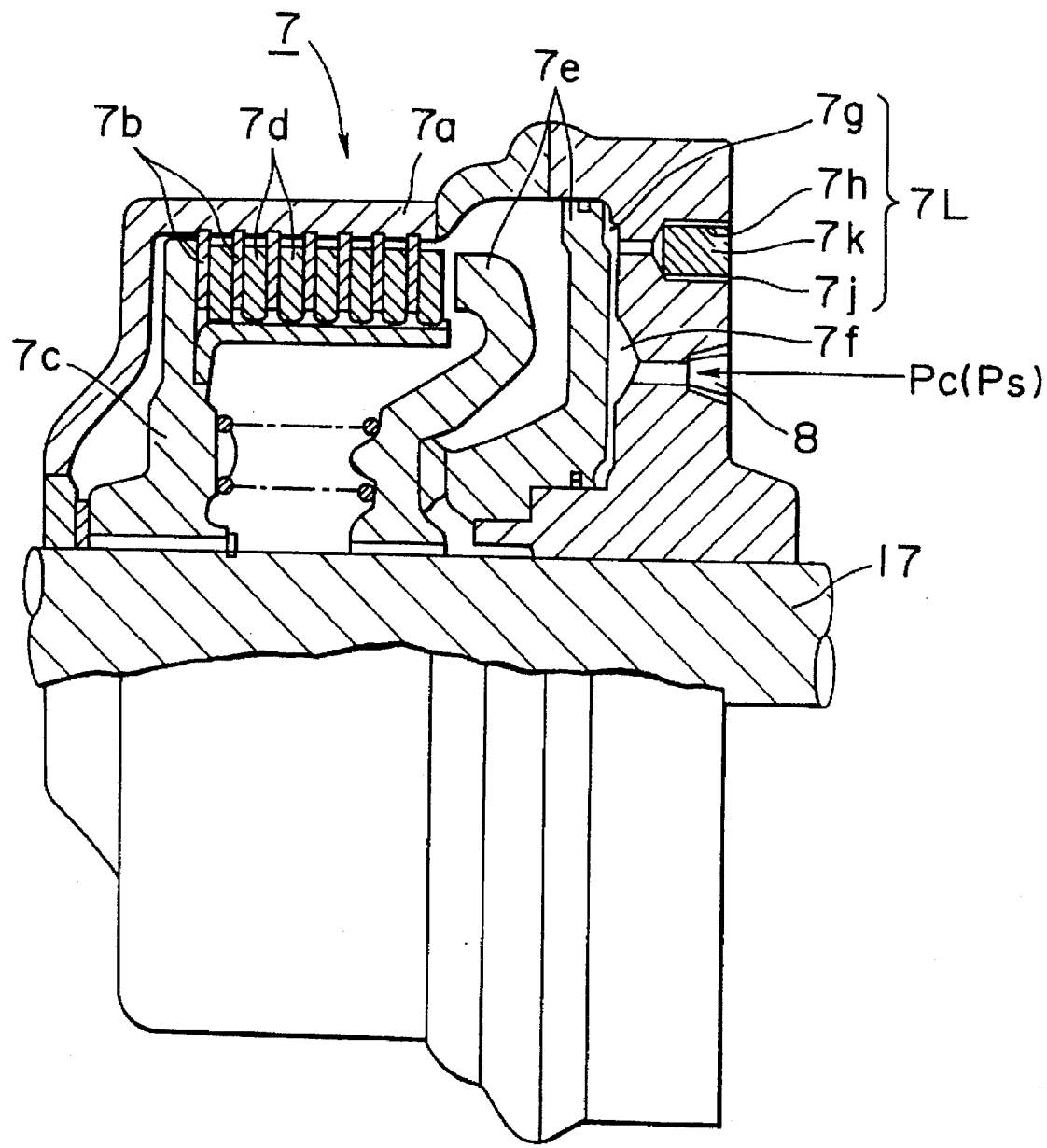
FIG. 5 is a cross-sectional view illustrating a variable torque transfer combined with the hydraulic pressure supply system according to the invention.

Referring now to the drawings, particularly to FIG. 3, there is shown a four-wheel drive vehicle equipped with a hydraulic pressure supply system of the invention. For the purpose of simplification of the disclosure, the same reference numerals used in the prior art disclosure shown in FIGS. 1 and 2 will be applied to the corresponding elements used in the first embodiment of FIG. 3. As seen in FIG. 3, the four-wheel drive vehicle mounting the pressure supply system 20 of the first embodiment has an engine 1 serving as a power source (driving torque source), a transmission 3a that transmits a driving torque in accordance with a selected gear ratio to a transmission output shaft (transfer input shaft), a driving force transmission system 3, which variably adjusts a distribution ratio of driving torque between front drive wheels 2FL and 2FR and rear drive wheels 2RL and 2RR, and a driving force distribution ratio control system 4. The driving force transmission system 3 includes a variable torque transfer 6 as well as the transmission 3a, so as to distribute the driving torque transmitted from the transmission 3a into the front and rear wheels. The variable torque transfer 6 includes a transfer clutch 7 which generally consists of a wet type multiple-disc clutch. The detailed structure of the transfer clutch 7 which is usable in combination with the hydraulic pressure supply system 20 according to the invention, is shown in FIG. 5. As seen in FIG. 5, the transfer clutch 7 includes a clutch drum 7a splined to the transfer input shaft 17 mechanically linked to the transfer casing, a plurality of friction plates 7b integrally connected to the clutch drum 7a, a clutch hub 7c rotatably supported on the outer periphery of the transfer input shaft 17, a plurality of friction discs 7d integrally connected to the clutch hub 7c, a clutch piston 7e disposed in the right (viewing FIG. 5) of the transfer clutch, and a cylinder chamber 7f defined between the right-hand side wall of the clutch piston 7e and the inner wall surface of the clutch drum 7a. Additionally, the transfer clutch 7 includes an essentially annular clearance type air bleed 7L formed in the right-hand side wall of the clutch drum 7a. The air bleed 7L is cooperative with a residual-air capturing chamber 7g defined between the substantially annular stepped side wall section on the perimeter of the clutch piston 7e and the inner wall surface of the clutch drum 7a to effectively extract air contained in the working fluid in the cylinder chamber 7f. The air bleed includes a communication hole 7h bored in the right-hand side wall of the clutch drum 7a for communicating the residual-air capturing chamber 7g to atmosphere, and a plug 7k loosely fitted into the communication hole 7h for defining a slight clearance 7j therebetween. The air bleed 7L functions to discharge undesirable air out of the cylinder chamber 7f, even when working fluid containing air therein is introduced through the inlet/outlet port 8 into the cylinder chamber 7f. Returning to FIG. 3, as a hydraulic pressure source for the hydraulic pressure supply system 20 of the first embodiment, utilized is an oil pressure source 21 with a reversible fluid pressure pump having a driven connection with the output shaft 17 of the transmission 3a, for instance. The oil pressure source 21 is fluidly connected through a hydraulic line 22 to the pressure supply system 20. The pressure supply system 20 is electrically connected to a control unit 40 to receive a control command produced by the latter. The control unit 40 is electrically connected to a front-left wheel speed sensor 10FL, a front-right wheel speed sensor 10FR, and a rear wheel speed sensor 10R disposed in the vicinity of a propeller shaft 10 mechanically connected to the rear differential, so as to receive wheel speed data and to generate the control command to the pressure supply system 20.

Figure 4:
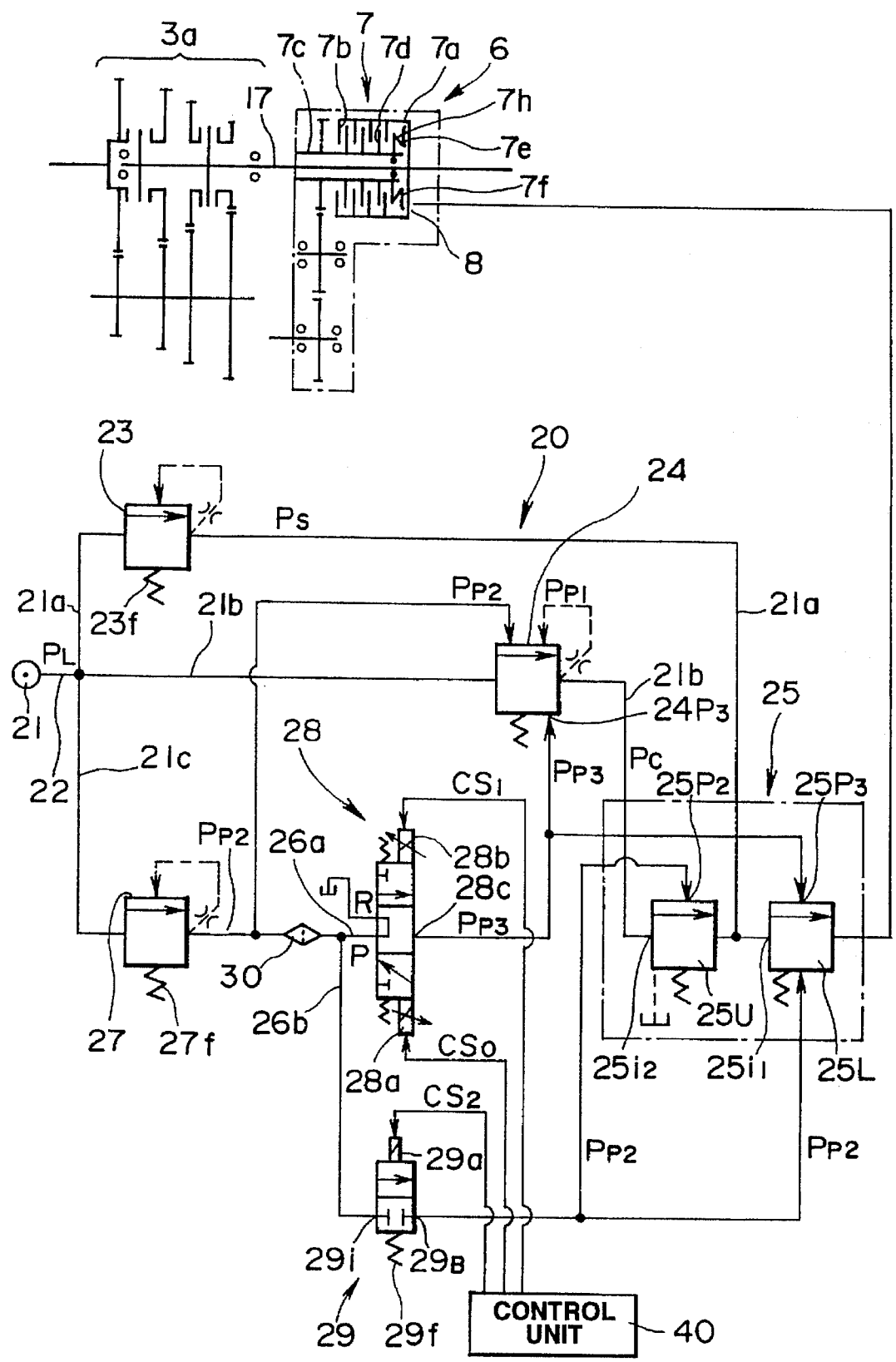
FIG. 4 is a block diagram illustrating the first embodiment of the hydraulic pressure supply system according to the invention.
Figure 6:
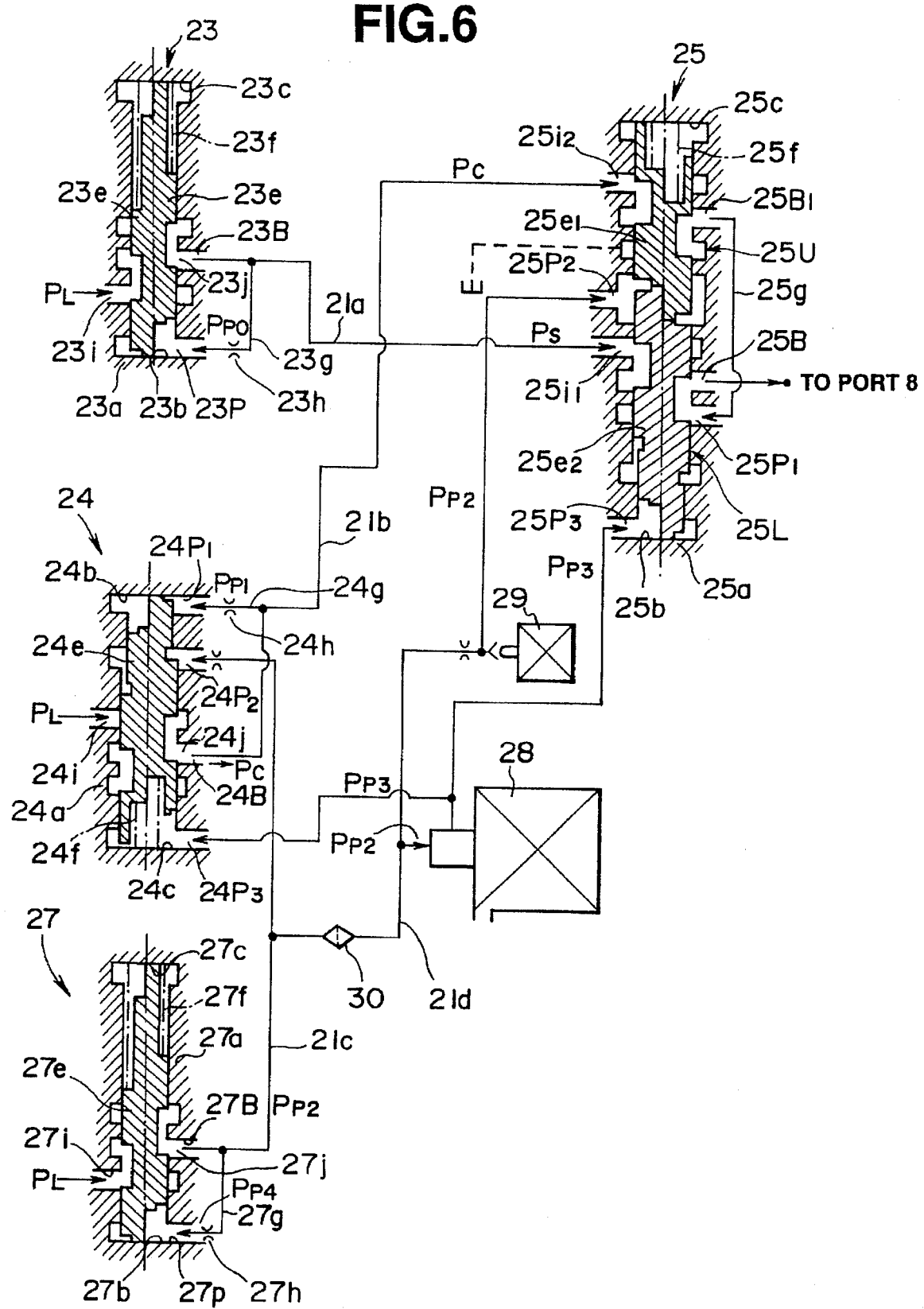
FIG. 6 is a longitudinal cross-sectional view illustrating a valve structure of the hydraulic pressure supply system of the first embodiment.

Referring to FIGS. 4 and 6, there are shown a hydraulic circuit diagram of the pressure supply system 20 and a detailed valve structure of various valves 23, 24, 25, 27, 28 and 29 provided in the pressure supply system 20 of the first embodiment. The pressure supply system 20 receives a line pressure $P_L$ regulated at a predetermined pressure level through the oil pressure source 21. As seen in the left-hand side of FIG. 4, the line 22 branches into three oil supply lines 21a, 21b and 21c. The branch line 21a is fluidly connected to an inlet port of a stand-by pressure valve 23 such as an internal-pilot type pressure reducing valve, while the branch line 21c is fluidly connected to an inlet port of a pilot valve 27 such as an internal-pilot type pressure reducing valve. The branch line 21b is fluidly connected to an inlet port of an internal-and-external pilot type pressure regulating valve 24. As seen in the right-hand side of FIG. 4, a directional control valve unit 25 consists of a pair of directional control valve sections 25L and 25U arranged in series to each other and integrally assembled to each other as a single directional control valve unit. The outlet port of the stand-by pressure valve 23 is connected to an inlet port $25_{i1}$ of the first valve section 25L, while the outlet port of the pressure regulating valve 24 is connected to an inlet port $25_{i2}$ of the second valve section 25U. The outlet port of the pilot valve 27 is connected via an oil filter 30 through an oil supply line 26a to a proportional electromagnetic type pressure control valve 28 such as a spring-center, dual solenoid, 3-port, 3-position proportional electromagnetic type pressure control valve. The outlet port of the pilot valve 27 is also connected via the oil filter 30 through an oil supply line 26b to an electromagnetic shut-off valve 29 such as a spring-offset type 2-port, 2-position electromagnetic shut-off valve. A secondary oil pressure output from the pressure control valve 28, that is, a controlled pressure $P_{P3}$ is supplied to the pressure regulating valve 24 as a pilot pressure acting in the same operational direction as the spring bias of a return spring 24f disposed in the valve 24. A portion of the controlled pressure $P_{P3}$ is supplied to the first valve section 25L as a pilot pressure acting in the reverse direction against a spring bias produced by a return spring 25f of the valve 25. A secondary oil pressure output from the shut-off valve 29, that is, an outgoing pressure $P_{P2}$ is, supplied to the second valve section 25U as a pilot pressure acting in the reverse operational direction against the bias of the return spring 25f disposed in the valve 25. A portion of the controlled pressure $P_{P2}$ is supplied to the first valve section 25L as a pilot pressure acting in the same direction as the return spring 25f. A portion of the controlled pressure $P_{P2}$ generated from the pilot valve 27 is also supplied to the pressure regulating valve 24 as a pilot pressure acting in the reverse operational direction against the spring bias of the return spring 24f.

As shown in FIG. 6, the stand-by pressure valve 23 includes a substantially cylindrical valve housing 23a, which housing defines therein a spool chamber, an inlet port 23i, an outlet port 23B and an internal-pilot port 23P, a valve spool 23e slidably disposed in the spool chamber of the housing 23a, and a return spring 23f operably disposed in one end 23c of the spool chamber to normally force the spool into abutment with the other end 23b of the spool chamber. One end of an internal-pilot line 23g is connected to the oil supply line 21a communicating the outlet port 23B, while the other end of the internal-pilot line 23g is connected to the internal-pilot port 23P via a fixed orifice 23h. When the line pressure $P_L$ having a predetermined pressure value is supplied through the inlet port 23i to the stand-by valve 23, a pilot pressure $P_{PO}$ introduced into the lower end of the spool chamber through the orifice 23h and the pilot port 23P causes the spool 23e to move upwards (viewing FIG. 6) against the bias of the spring 23f. The spool 23e moves upwards until the spring bias is balanced to the pilot pressure $P_{PO}$ with the result that the spool 23e is maintained at the balanced position. As a result, a variable orifice portion 23j of the outlet port 23B is set to a predetermined opening degree, i.e., a predetermined constricting rate. Accordingly, through the previously-noted orifice constriction, the incoming line pressure $P_L$ is decreasingly adjusted at a pressure level slightly less than a predetermined clutch pressure level $P_{C1}$ at which the transfer clutch 7 starts to engage. The decreasingly adjusted pressure, that is, the secondary oil pressure generated from the outlet port 23B of the stand-by pressure valve 23 will be hereinafter referred to as a "stand-by pressure $P_S$." As seen in FIG. 6, the stand-by pressure $P_S$ is fed through the supply line 21a to the inlet port 25i1 of the first valve section 25L of the directional control valve unit 25. When the stand-by pressure $P_S$ is fed through the first valve section 25L to the inlet/outlet port 8 of the transfer clutch 7, the friction discs 7d are maintained in slightly axially spaced relationship with the respective friction plates 7b by a predetermined slight distance. The slightly spaced position of the clutch 7 will be hereinafter referred to as a "stand-by position". Thus, if a controlled clutch pressure $P_C$ greater than the stand-by pressure $P_S$ is applied to the clutch 7 under a condition wherein the clutch is held in the stand-by position, the clutch can be quickly engaged with a high response.

The pressure regulating valve 24 includes a substantially cylindrical valve housing 24a, which defines therein a spool chamber, an inlet port 24i, an outlet port 24B, an internal-pilot port 24P₁, a constant-pressure external-pilot port 24P₂ and a variable-pressure external-pilot port 24P₃, a valve spool 24e slidably disposed in the spool chamber of the housing 24a, and a return spring 24f operably disposed in one end 24c of the spool chamber to normally force the spool into abutment with the other end 24b of the spool chamber. An internal-pilot line 24g branches away from the oil supply line 21b connected to the outlet port 24B. The internal-pilot line 24g is connected via a fixed orifice 24h to the internal-pilot port 24P₁. A hydraulic pressure $P_{P1}$, which pressure is introduced via the fixed orifice 24h into the internal-pilot port 24P₁, functions as a pilot pressure acting in the reverse direction against the return spring 24f of the valve 24. The constant-pressure external-pilot port 24P₂ receives the controlled pressure $P_{P2}$, which is generated from the pilot valve 27 and held at a substantially constant pressure level. On the other hand, the variable-pressure external-pilot port 24P₃ receives the controlled pressure $P_{P3}$ which pressure is produced by the pressure control valve 28 and varies in proportion to a value of a command signal $CS_1$ generated by the control unit 40, as explained later. When the line pressure $P_L$ is supplied through the inlet port 24i to the pressure regulating valve 24, the pilot pressure $P_{P1}$ introduced into the upper end of the spool chamber and the pilot pressure $P_{P2}$ introduced into the pilot port 24P₂ cause the spool 24e to move downwards (viewing FIG. 6) against a resultant force of the bias of the spring 24f and the controlled pressure $P_{P3}$. The spool 24e moves downwards until the resultant force of the spring bias and the controlled variable pressure $P_{P3}$ is balanced to the resultant force of the pilot pressures $P_{P1}$ and $P_{P2}$, with the result that the spool 24e is maintained at the balanced position. As a result, a variable orifice portion 24j of the outlet port 24B is set to a predetermined opening degree, i.e., a predetermined constricting rate. The opening degree of the variable orifice 24j is increased as the magnitude of the pilot pressure $P_{P3}$ produced by the valve 28 is increased. The incoming line pressure $P_L$ is suitably adjusted in proportion to the magnitude of the controlled variable pressure $P_{P3}$. The secondary oil pressure generated by the outlet port 24B of the pressure regulating valve 24 will be hereinafter referred to as a "clutch pressure $P_C$." As seen in FIG. 6, the clutch pressure $P_C$ is fed through the supply line 21b to the inlet port 25i2 of the second valve section of the directional control valve unit 25, described in detail below.

The directional control valve unit 25 is a multi-directional control valve consisting of two directional control valve sections, namely the first and second directional control valve sections 25L and 25U. As seen in FIG. 6, the directional control valve unit 25 includes a substantially cylindrical valve housing 25a defining therein a spool chamber, two inlet ports 25i1 and 25i2, an outlet port 25B, an internal outlet port 25B₁, an internal-pilot port 25P₁, a constant-pressure external-pilot port 25P₂ and a variable-pressure pilot port 25P₃, first (upper) and second (lower) valve spools 25e and 25e2 both slidably disposed in the spool chamber of the housing 25a and arranged in series to each other and moveable towards and away from each other in the spool chamber, and a return spring 25f operably disposed in one end 25c of the spool chamber to normally bias the upper spool 25e1 towards the other end 25b, while abutting the lower spool 25e2 with the other end 25b. An internal-pilot line 25g is provided to interconnect the internal outlet port 25B₁ and the internal-pilot port 25P₁. The constant-pressure external-pilot port 25P₂ receives the controlled variable pressure $P_{P3}$ generated by the pressure control valve 28. Assuming that a character $A_1$ denotes an effective pressure receiving area of the first spool 25e1, a character $A_2$ denotes an effective pressure receiving area of the second spool 25e2, and a character $F_1$ denotes a downwardly acting spring bias of the spring 25f, an upward operational force $F_2$ acting on the second spool 25e2 owing to the controlled variable pressure $P_{P3}$ is represented by an equation $F_2=P_{P3} \times A_2$, a downward operational force $F_3$ acting on the first spool 25e1 owing to the clutch pressure $P_C$ is represented by an equation $F_3=P_C \times A_1$, an upward operational force $F_4$ acting on the first spool 25e1 owing to the controlled constant pressure $P_{P2}$ is represented by an equation $F_4=P_{P2} \times A_1$, a downward operational force $F_5$ acting on the second spool 25e2 owing to the controlled constant pressure $P_{P2}$ is represented by an equation $F_5=P_{P2} \times A_2$, and a downward operational force $F_6$ acting on the second spool 25e2 owing to the stand-by pressure $P_S$ is represented by an equation $F_6=P_S \times A_2$. In consideration of an equilibrium of the above-mentioned forces $F_1$ to $F_6$, when $F_2 > F_1 \times F_3 + F_5 + F_6 - F_4$, the first and second spools 25e₁ and 25e₂ both move towards the end 25c of the spool chamber and as a result the two spools 25e1 and $25_{e2}$ are held in the uppermost position illustrated in the left-half cross-section of FIG. 6. Under this condition, a full fluid communication between the inlet port $25_{i1}$ and the outlet port 25B is established, with the result that the stand-by pressure $P_S$ is output from the outlet port 25B via the inlet port $25_{i1}$.

On the other hand, in case of $F_2=0$, that is, when the controlled variable pressure $P_{P3}$ is not supplied to the directional control valve 25, a spring constant of the spring 25f is designed so that the two spools $25_{e1}$ and $25_{e2}$ are both held in the lowermost position illustrated in the right-half cross-section of FIG. 6. Under this condition, a fluid communication between the inlet port $25_{i2}$ and the internal outlet port $25B_1$ (consequently the outlet port 25B) and a fluid communication between the inlet port $25_{i1}$ and the outlet port 25B are both blocked by the spools. In case of $F_5>0$, $F_2>0$, and $F_4>F_1$, the second spool $25_{e2}$ is held in an axially spaced relationship with the first spool $25_{e1}$, because the first spool $25_{e1}$ moves upwards against the spring bias due to the relation of $F_4>F_1$ and the second spool $25_{e2}$ is held in the lowermost position due to the relation of $F_5>F_2$ (because the primary oil pressure $P_{P2}$ of the valve 28 is greater than the secondary oil pressure $P_{P3}$). Thus, the fluid communication between the inlet port $25_{i1}$ and the outlet port 25B is blocked by way of the second spool $25_{e2}$ held in the lowermost position and the full fluid communication between the inlet port $25_{i2}$ and the internal outlet port $25B_1$ (consequently the outlet port 25B) is established. As a result, only the clutch pressure $P_C$ is supplied through the inlet port $25_{i2}$ and the outlet port 25B to port 8 of the transfer clutch. In other words, the directional control valve unit 25 operates such that only the stand-by pressure $P_S$ is selected as a secondary oil pressure discharged from the valve 25 in case of the resultant force of the upward acting forces $F_2$ and $F_4$ exceeds the resultant force of the downward acting forces $F_1$, $F_3$, $F_5$ and $F_6$, that is, the two spools $25_{e1}$ and $25_{e2}$ are both held in the uppermost position. Alternatively, when the first spool $25_{e1}$ is held in the uppermost position and the second spool $25_{e2}$ is held in the lowermost position, only the clutch pressure $P_C$ is selected as the secondary oil pressure.

The pilot valve 27 essentially consisting of the internal-pilot type pressure reducing valve, includes a substantially cylindrical valve housing 27a defining therein a spool chamber, and inlet port 27i, an outlet port 27B and an internal-pilot port 27P, a valve spool 27e slidably disposed in the spool chamber of the housing 27a, and a return spring 27f operably disposed in one end 27c of the spool chamber to normally force the spool into abutment with the other end 27b of the spool chamber. One end of an internal-pilot line 27g is connected to the oil supply line 21c communicating the outlet port 27B, while the other end of the internal-pilot line 27g is connected to the internal-pilot port 27P via a fixed orifice 27h. When the line pressure $P_L$ is supplied through the inlet port 27i to the pilot valve 27, a pilot pressure $P_{P4}$ introduced into the lower end of the spool chamber through the orifice 27h and the pilot port 27P causes the spool 27e to move upwards (viewing FIG. 6) against the bias of the spring 27f. The spool 27e moves upwards until the spring bias is balanced to the pilot pressure $P_{P4}$ with the result that the spool 27e is maintained at the balanced position. As a result, a variable orifice portion 27j of the outlet port 27B is set to a predetermined opening degree, i.e., a predetermined constricting rate. Accordingly, through the previously-noted orifice constriction, the incoming line pressure $P_L$ is decreasingly adjusted at a pressure level less than the introduced line pressure $P_L$. The decreasingly adjusted pressure, that is, the secondary oil pressure generated by the outlet port 27B of the pilot pressure valve 27 corresponds to the controlled constant-pilot pressure $P_{P2}$ output to the three ports, namely the inlet port P of the pressure control valve 28, the external-pilot port $24P_2$ of the pressure regulating valve 24, and the external-pilot port $25P_2$ of the directional control valve unit 25. As seen in FIG. 6, the pilot pressure $P_{P2}$ is fed through the supply line 21c, the oil filter 30 and the oil supply line 21d to the inlet port P of the pressure control valve 28 and via the shut-off valve 29 to the external-pilot port $25P_2$ of the directional control valve 25.

Figure 7A:
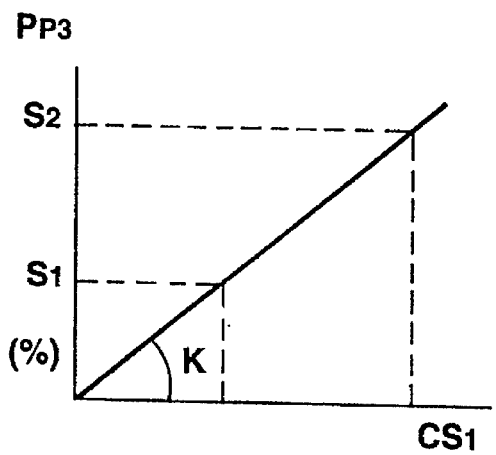
FIG. 7A is a graph illustrating a command current value $CS_1$ versus controlled pilot pressure $P_{P3}$ characteristic.
Figure 7B:
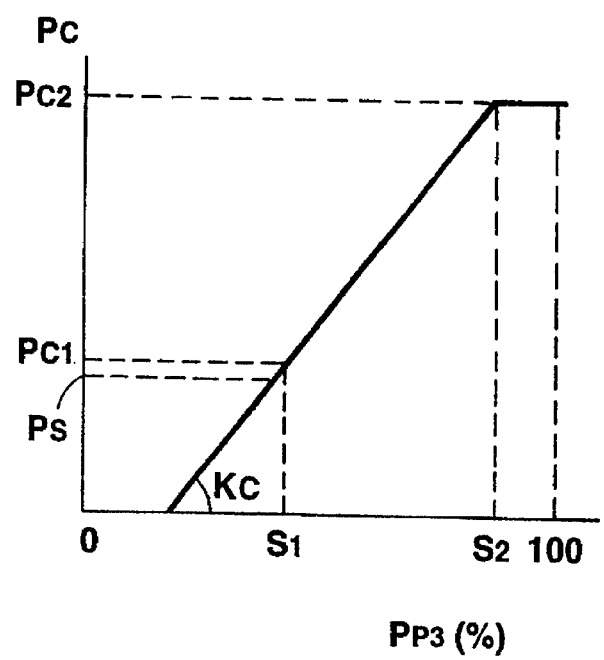
FIG. 7B is a graph illustrating a controlled pilot pressure $P_{P3}$ versus controlled clutch pressure $P_C$.

As shown in FIG. 4, the proportional electromagnetic type pressure control valve 28 essentially consisting of a spring-center, dual solenoid, 3-port, 3-position proportional electromagnetic type pressure control valve, includes the inlet port P connected via the oil filter 30 to the pilot valve 27, a drain port R communicating with the oil reservoir, and an outlet control port 28c fluidly connected to two ports, namely the external-pilot port $24P_3$ of the pressure regulating valve 24 and the external-pilot port $25P_3$ of the directional control valve 25. The electromagnetic type pressure control valve 28 has two solenoids 28a and 28b. The solenoid 28a is responsive to a control signal $CS_0$ generated from the control unit 40, while the solenoid 28b is responsive to another control signal $CS_1$ produced by the same control unit. When a signal value of the control signal $CS_0$ is conditioned at a low level less than a predetermined threshold, the first solenoid 28a is de-activated. In contrast, when a signal value of the control signal $CS_0$ is conditioned at a high level greater than the predetermined threshold, the first solenoid 28a is activated. In other words, the first solenoid 28a is controlled by way of an ON-OFF control based on the control signal $CS_0$ produced by the control unit 40. As appreciated from FIG. 4, when the first solenoid is activated by the control signal $CS_0$, the lowermost rectangular block is selected among three blocks of the valve 28, with the result that a fluid communication between the drain port R and the control port 28c is established, while blocking a fluid communication between the inlet port P and the control port 28c. On the other hand, the second solenoid 28b consists of a proportional solenoid so designed to adjust a secondary oil pressure output from the valve 28 in proportion to the signal value of the control signal $CS_1$ with a predetermined proportional gain K, as illustrated in the graph of FIG. 7A. The secondary pressure generated from the pressure control valve 28 corresponds to a controlled variable pilot pressure $P_{P3}$ supplied to the external-pilot port $24P_3$ of the pressure regulating valve 24 and to the external-pilot port $25P_3$ of the directional control valve unit 25. As previously explained, since the opening degree of the variable orifice 24j of the pressure regulating valve 24 is increased in accordance with an increase in the pilot pressure $P_{P3}$ and as a result the clutch pressure $P_C$ regulated by and generated from the pressure regulating valve 24 is adjusted in proportion to the magnitude of the pilot pressure $P_{P3}$ with a predetermined proportional gain $K_C$, as illustrated in FIG. 7B. In FIG. 7B, a controlled pilot pressure $P_{P3}$ having a predetermined low pressure level represented by $S_1$ % corresponds to a clutch pressure $P_{C1}$ at which the transfer clutch starts to be engaged, that is, the clutch 7 is engaged lightly or softly. At the clutch pressure $P_{C1}$, the driving-torque distribution ratio between front and rear wheels is 0 : 100, i.e., the vehicle is operated in the rear-wheel drive mode. A controlled pilot pressure $P_{P3}$ having a predetermined high pressure level represented by $S_2$ % corresponds to a clutch pressure $P_{C2}$ at which the transfer clutch is engaged tightly. As illustrated in the right-half cross section of FIG. 6, when the pilot pressure $P_{P3}$ has reached the highest possible pressure level represented by $S_2$ %, the spool 24e is held in the uppermost position, and whereby the opening degree of the variable orifice 24j of the outlet port 24B has also reached at a maximum. Thus, the highest possible clutch pressure $P_{C2}$ substantially equivalent to the incoming line pressure $P_L$ is output from the outlet 24B, under application of the highest possible pilot pressure $P_{P3}$. At the clutch pressure $P_{C2}$, the clutch 7 is engaged tightly and thus the driving-torque distribution ratio between front and rear wheels becomes 50 : 50, i.e., the vehicle is operated in the four-wheel drive mode.

As clearly seen in FIG. 4, the electromagnetic shut-off valve 29 essentially consisting of a spring-offset type 2-port, 2-position electromagnetic shut-off valve, includes a valve housing formed with an inlet port 29i and an outlet control port 29B, an electromagnetic solenoid 29a, which solenoid is responsive to a control signal $CS_2$ generated from the control unit 40, and a return spring 29f provided for normally holding the valve 29 in its shut-off position shown in FIG. 4 when the solenoid 29a is deactivated. When a signal value of the control signal $CS_2$ is conditioned at a low level less than a predetermined threshold, the solenoid 29a is de-activated. In contrast, when a signal value of the control signal $CS_2$ is conditioned at a high level greater than the predetermined threshold, the first solenoid 29a is activated. In this manner, the solenoid 29a is controlled by way of an ON-OFF control based on the control signal $CS_2$ produced by the control unit 40. As appreciated from FIG. 4, when the solenoid 29a is activated by the control signal $CS_2$, the uppermost rectangular block is selected among two blocks of the valve 29, with the result that a fluid communication between the inlet port 29i and the control port 29B is established to supply the tuned constant pilot pressure $P_{P2}$ produced by the pilot valve 27 into the constant pressure external-pilot port 25$P_2$ of the directional control valve unit 25. When the control unit 40 determines that the rear-wheel speed detected by the rear-wheel speed sensor 10R is greater than the front-wheel speed detected by the respective front-wheel speed sensor 10FL and 10FR, the control unit 40 generates the control signals $CS_0$, $CS_1$ and $CS_2$ so as to properly control the respective valves 28 and 29. The hydraulic pressure supply system 20 of the first embodiment operates as follows.

When the ignition switch is turned ON and the line pressure $P_L$ is produced by way of the oil pressure source 21, the line pressure $P_L$ is fed via the line 22 to the respective valves 23, 24 and 27. The line pressure $P_L$ fed to the pilot valve 27 is regulated and reduced at a predetermined constant pressure level, that is, at the previously-noted pilot pressure $P_{P2}$. The pilot pressure $P_{P2}$ is supplied from the pilot valve 27 to the three valves, namely the pressure regulating valve 24, the proportional electromagnetic type pressure control valve 28 and the electromagnetic shut-off valve 29. The line pressure $P_L$ fed to the stand-by pressure valve 23 is regulated and reduced at a predetermined constant pressure level, that is, at the previously-noted stand-by pressure $P_S$ slightly less than the predetermined clutch pressure $P_{C1}$ by a predetermined offset pressure value. The stand-by pressure $P_S$ is supplied to the inlet port 25$_{i1}$ of the directional control valve 25. Upon the pressure regulating valve 24 receives the pilot pressure $P_{P2}$ from the pilot valve 27, the spool 24e moves towards the end 24c against the spring bias and is held in the lowermost position shown in the left-half cross-section of FIG. 6 to block the fluid communication between the inlet port 24i and the outlet port 24B. In this case, there is no supply of the clutch pressure $P_C$ to the directional control valve unit 25. Under this condition, when the control unit 40 generates only the control signal $CS_1$ essentially corresponding to a solenoid exciting current adjustably generated by the control unit 40, which current value of the control signal SC1 is equivalent to the pilot pressure $P_{P3}$ having a predetermined maximum pressure level represented by 100% in FIG. 7B, to the proportional solenoid 28b, the electromagnetic valve 28 outputs the maximum pilot pressure $P_{P3}$ to the variable-pressure external-pilot port 25$P_3$ of the directional control valve unit 25. At this time, since the other control signals $CS_0$ and $CS_2$ both remain at a low signal level and thus the shut-off valve 29 is deactivated and held in the shut-off position, the pilot pressure $P_{P2}$ is not yet supplied to the external-pilot port 25$P_2$ of the directional control valve unit 25. As appreciated, owing to supply of only the high-level pilot pressure $P_{P3}$ to the pilot port 25$P_3$, the predetermined condition indicated by the inequality ($F_2 > F_1 + F_3 + F_5 + F_6 - F_4$) is satisfied, and as a result the two spools 25$_{e1}$ and 25$_{e2}$ both move toward the end 25c against the spring bias. Thus, the full fluid communication between the inlet port 25$_{i1}$ and the outlet port 25B is established, with the result that only the stand-by pressure $P_S$ is supplied through the directional control valve 25 to the inlet/outlet port 8 of the transfer clutch 7. The transfer clutch 7 is preset in the stand-by position in which the friction discs are maintained in slightly axially spaced relationship with the respective friction plates by a predetermined slight distance. With the transfer clutch held in the stand-by position, since the clutch 7 is not yet engaged, the vehicle can operate at the rear-wheel drive mode. In the event that the vehicle driving condition is changed from a straight-ahead driving on high-friction roads such as dry pavements to a straight-ahead driving on a low-friction road condition such as wet or icy roads, the vehicle may experience rear wheel-slip. In case of the occurrence of the acceleration slip at rear drive wheels, since the detected rear-wheel speed exceeds the detected front-wheel speed, the control unit 40 outputs the high-level control signal $CS_2$ to the solenoid 29a of the shut-off valve 29, and also outputs the control signal $CS_1$ corresponding to an exciting current, which current value is equivalent to the pilot pressure $P_{P3}$ being within a pressure range of $P_{C1}$ to $P_{C2}$ respectively represented by $S_1$ % to $S_2$ % in FIG. 7B, to the proportional solenoid 28b. Upon the electromagnetic shut-off valve 29 receiving the high-level control signal $CS_2$, the valve 29 is shifted to the full open position to supply the pilot pressure $P_{P2}$ to the pilot port 25$P_2$ of the directional control valve unit 25. Owing to supply of the pilot pressure $P_{P2}$ to the pilot port 25$P_2$, the upward acting force $F_4$ and the downward acting force $F_5$ are applied to the first and second spools 25$_{e1}$ and 25$_{e2}$, respectively. Thus, the previously-described predetermined condition of ($F_5 > 0$, $F_2 > 0$, $F_4 > F_1$, and $F_5 > F_2$) is satisfied. Thus, the first spool 25$_{e1}$ is held in the uppermost position, while the second spool 25$_{e2}$ is held in the lowermost position. In this manner, the spool position of the directional control valve unit 25 is properly changed such that only a properly regulated clutch pressure $P_C$ being within a pressure range of $P_{C1}$ to $P_{C2}$ can be supplied through the valve unit 25 to the clutch 7. According to the pressure supply system 20 of the first embodiment, since the clutch 7 is initially set at the stand-by position by way of supply of the stand-by pressure $P_S$, the friction discs 7d can rapidly abut the respective friction plates 7b upon the clutch pressure $P_C$ is fed to the inlet/outlet port 8 of the clutch 7. Thus, a portion of driving torque transmitted from the engine to the transfer 6 can be delivered to the front wheels as well as the rear wheels with a high response, so as to rapidly shift from the rear-wheel drive mode to the four-wheel drive mode and consequently to enhance a driving stability of the vehicle.

In the event that the transfer clutch 7 is engaged for the purpose of transmission of a portion of braking torque applied to the rear wheels to the front wheels during deceleration slip occurring owing to quick braking, for example, the clutch can be rapidly engaged by way of the stand-by pressure $P_S$ initially applied to the clutch 7, in the same manner as the previously-noted acceleration-slip. As set forth above, since a portion of braking torque to be applied to the rear wheels is rapidly transmitted to the front wheels during deceleration slip, a braking balance between the front and rear wheels is enhanced. That is, an anti-skid control performance can be effectively improved.

According to the hydraulic pressure supply system 20 of the first embodiment, since when the vehicle is running at the rear-wheel drive mode, the clutch 7 is always preset in the stand-by position by suitably controlling the pressure regulating valve 24 and the directional control valve unit 25 by way of the two electromagnetic valves, namely the proportional electromagnetic type pressure control valve 28 responsive to the control signals $CS_0$ and $CS_1$ and the electromagnetic shut-off valve 29 responsive to the control signal $CS_2$, an engaging action of the transfer clutch 7 can be achieved with a high response in case of necessity of the previously-noted total control according to which the variable torque control of the transfer clutch is performed in cooperation with the front-and-rear wheel speed difference dependent traction control, the four wheel anti-skid brake control or the like.

In the presence of electrical damage to the solenoid 28b of the proportional electromagnetic type pressure control valve 28, such as a short-circuit or breaking of a solenoid coil, the electromagnetic valve 28 cannot operate normally. When the controlled pilot pressure $P_{P3}$ is not supplied to the pilot port $25P_3$ of the directional control valve unit 25 owing to such an electrical abnormality of the electromagnetic valve 28, the particular condition of $F_2=0$ is satisfied. In case of $F_2=0$, the spools $25_{e1}$ and $25_{e2}$ are kept in lowermost position illustrated in the right-half cross-section of FIG. 6. As a result, the controlled clutch pressure $P_C$ is not supplied to the inlet/outlet port 8 and thus the vehicle is retained at the rear-wheel drive mode.

Second embodiment

Figure 8:
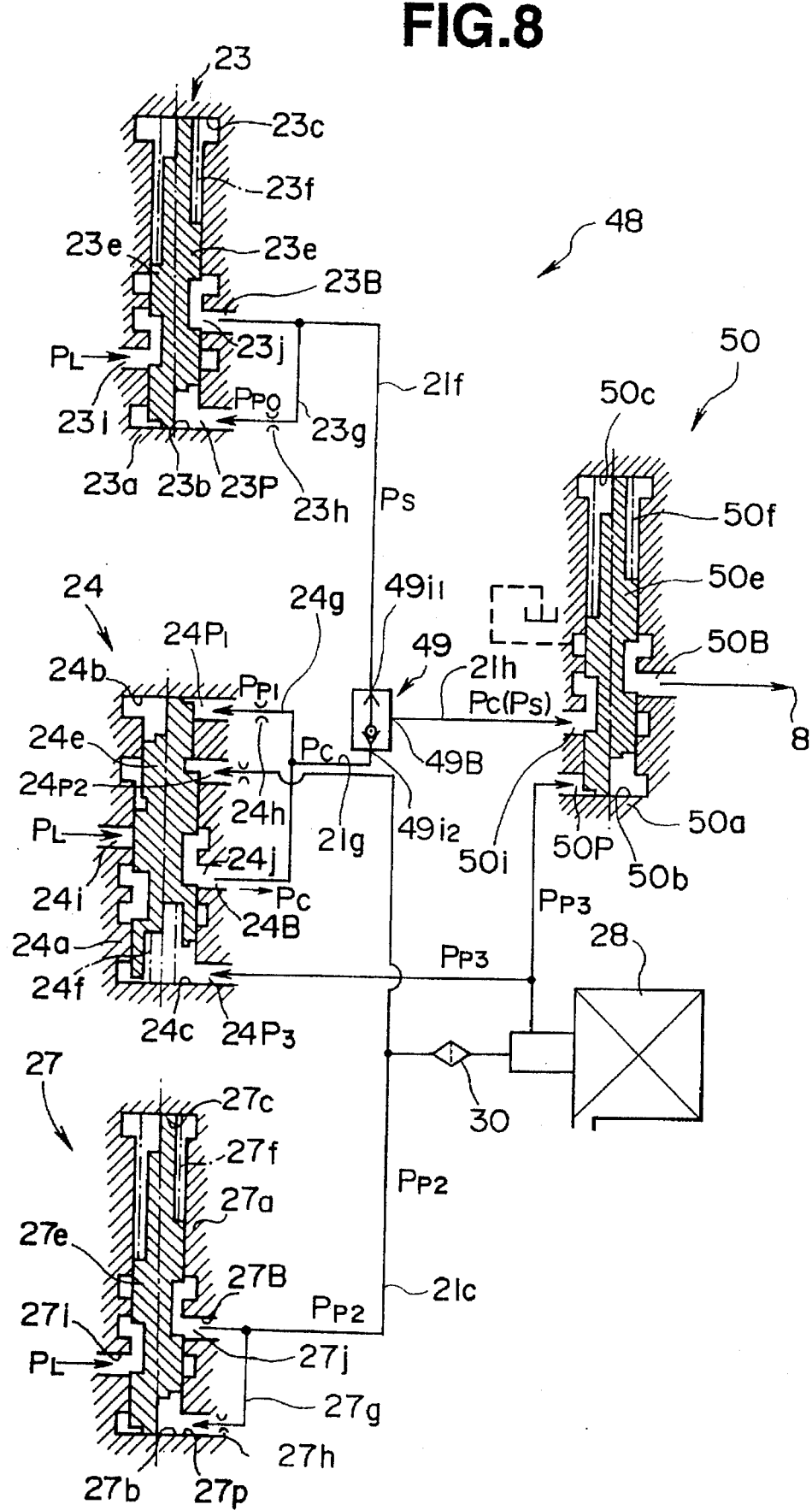
FIG. 8 is a longitudinal cross-sectional view illustrating a valve structure of a hydraulic pressure supply system of a second embodiment.

Referring now to FIG. 8, there is shown a valve structure of valves used in the hydraulic pressure supply system 48 of the second embodiment. The basic construction of the pressure supply system 48 of the second embodiment shown in FIG. 8 is similar to that of the first embodiment shown in FIG. 6. Therefore, the same reference numerals used in the first embodiment of FIG. 6 will be applied to the corresponding elements used in the second embodiment of FIG. 8, for the purpose of comparison between the first and second embodiments. The second embodiment is different from the first embodiment in that the dual-spool type directional control valve unit 25 and the electromagnetic shut-off valve 29 are replaced with a single-spool type directional control valve 50 and a high-pressure preferential type shuttle valve 49. As seen in FIG. 8, the valve structure of the directional control valve 50 utilized in the pressure supply system 48 is more simplified as compared with the directional control valve unit 25 of the first embodiment. The shuttle valve 49 has two inlet ports $49_{i1}$ and $49_{i2}$ and a single outlet port 49B. The inlet port $49_{i1}$ is fluidly connected via a line 21f to the outlet port 23B of the stand-by pressure valve 23, while the inlet port $49_{i2}$ is fluidly connected via a line 21g to the outlet port 24B of the pressure regulating valve 24. On the other hand, the outlet port 49B is fluidly connected via a line 21h to an inlet port 50i of the directional control valve 50. As is generally known, the shuttle valve 49 is so designed that the inlet on high pressure side is connected to the outlet, and that the inlet on low pressure side is closed. Thus, the shuttle valve 49 selectively outputs a higher one of the two incoming pressures, namely the stand-by pressure $P_S$ and the clutch pressure $P_C$. The directional control valve 50 has a substantially cylindrical valve housing 50a defining therein a spool chamber, an inlet port 50i, an outlet port 50B and an external-pilot port 50P, a valve spool 50e slidably disposed in the spool chamber of the housing 50a, and a return spring 50f operably disposed in one end 50c of the spool chamber to normally force the spool into abutment with the other end 50b of the spool chamber. The external-pilot port 50P is fluidly connected to the outlet port 28c of the electromagnetic valve 28 to receive the controlled pilot pressure $P_{P3}$ from the electromagnetic valve 28. In the absence of the pilot pressure $P_{P3}$ to the external-pilot port 50P, the spool 50e is held in the lowermost position by way of the spring bias, as seen in the left-half cross-section of FIG. 8, with the result that a full fluid communication between the inlet port 50i and the outlet port 50B is established. The hydraulic pressure supply system 48 of the second embodiment operates as follows.

According to the turned-ON operation of the ignition switch, when the line pressure $P_L$ is produced by way of the oil pressure source 21, the line pressure $P_L$ is fed via the line 22 to the respective valves 23, 24 and 27. Therefor, since the pressure regulating valve 24 receives the pilot pressure $P_{P2}$ produced by the pilot valve 27, the spool 24e moves towards the end 24c against the bias of the spring 24f to block the fluid communication between the inlet port 24i and the outlet port 24B. Therefore, there is no supply of the clutch pressure $P_C$ to the inlet port $49_{i2}$ of the shuttle valve 49. In this case, since the incoming stand-by pressure $P_S$ fed to the inlet $49_{i1}$ is necessarily greater than the incoming clutch pressure $P_C$ (approximately zero), only the stand-by pressure $P_S$ is fed through the shuttle valve 49 to the directional control valve 50, with the result that the clutch 7 is held in the stand-by position. Upon the control unit 40 determining that the detected rear-wheel speed becomes increased as compared with the detected front-wheel speed, the control unit 40 increasingly adjusts a signal level of the control signal $CS_1$ essentially corresponding to the exciting current applied to the solenoid 28b of the electromagnetic valve 28. In this manner, when the controlled pilot pressure $P_{P3}$ is increased in proportion to the increase in the signal value $CS_1$ (exciting current) and reached within a pressure range represented by $S_1$ (equivalent to the clutch pressure $P_{C1}$) to $S_2$ % (equivalent to the clutch pressure $P_{C2}$), the clutch pressure $P_C$ greater than the stand-by pressure $P_S$ is output from the pressure regulating valve 24. Accordingly, the shuttle valve 49 selects the clutch pressure $P_C$ as a higher one of the two incoming pressures $P_C$ and $P_S$. In the presence of acceleration-slip or deceleration-slip, the clutch pressure $P_C$ is supplied through the shuttle valve 49 and the directional control valve 50 to the inlet/outlet port 8 of the transfer, since the spring bias of the spring 50f is so designed that the spool 50e of the valve 50 is held in the lowermost position under the clutch pressure $P_C$, due to the equilibrium of forces applied to the spool 50e, namely the pilot pressure $P_{P3}$, the incoming clutch pressure $P_C$ and the bias of the spring 50f. As appreciated, the pressure supply system 48 of the second embodiment can provide the same effects as the first embodiment.

Third embodiment

Figure 9:
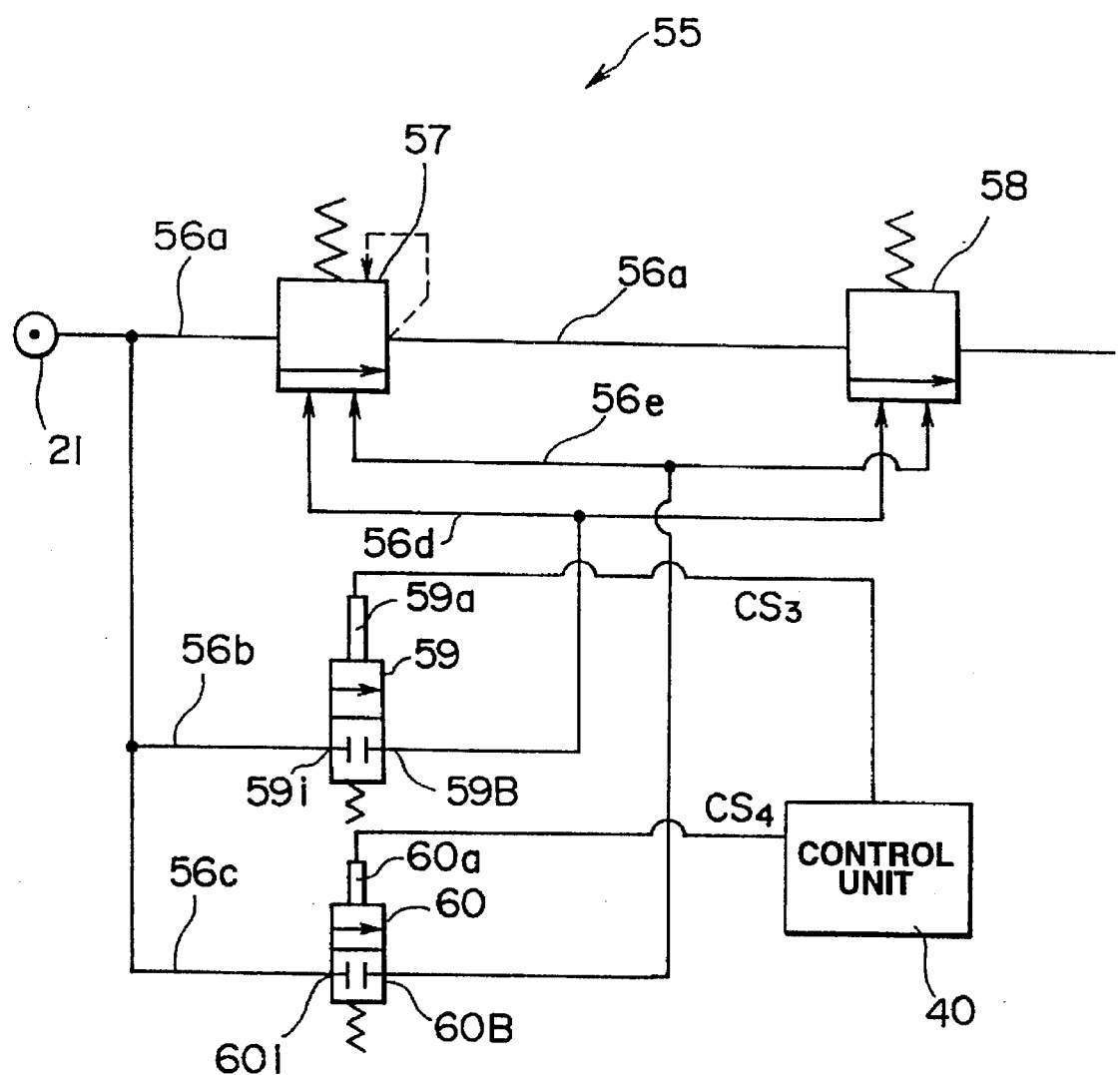
FIG. 9 is a block diagram illustrating a hydraulic pressure supply system of a third embodiment.
Figure 10:
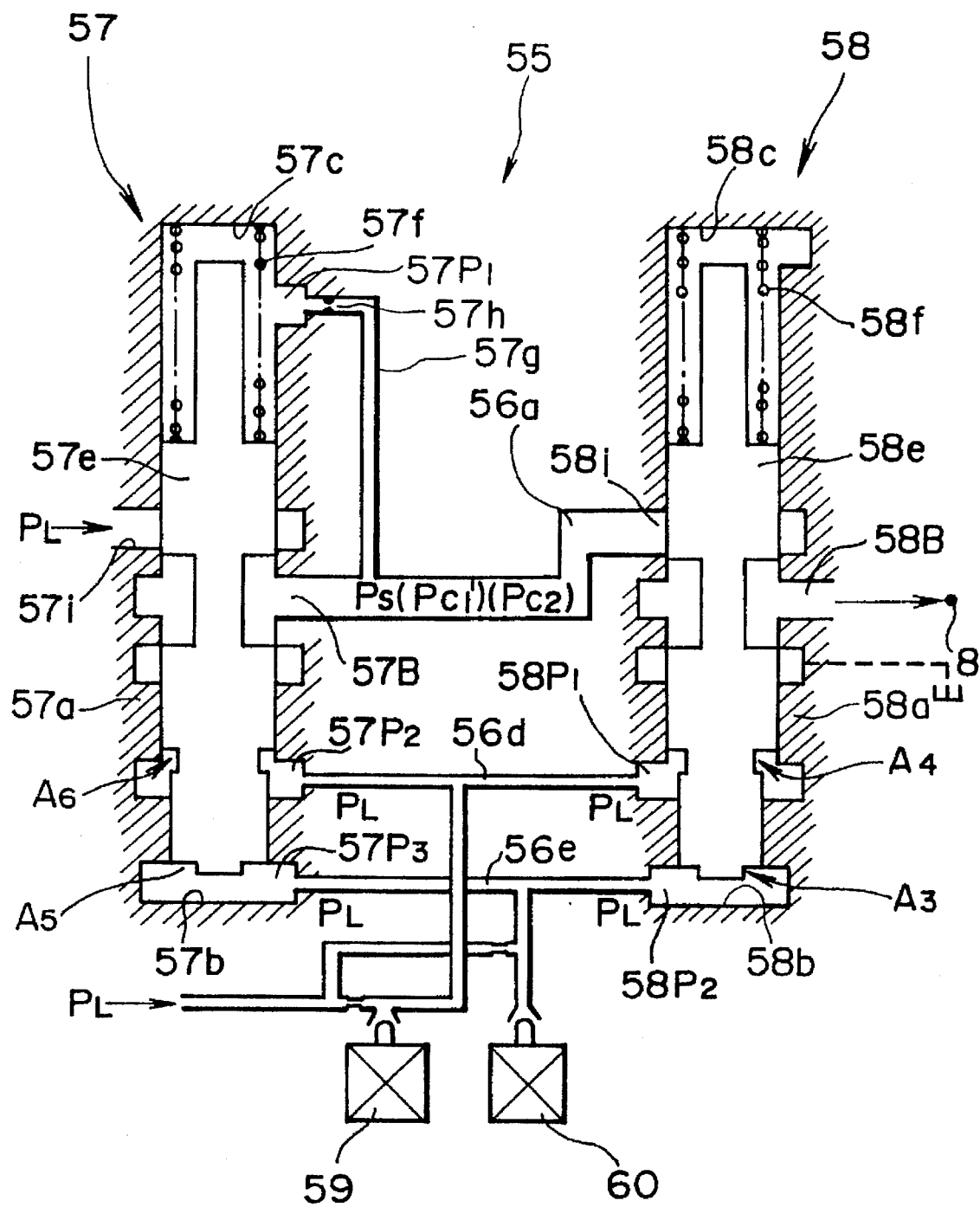
FIG. 10 is a longitudinal cross-sectional view illustrating a valve structure of the hydraulic pressure supply system of a third embodiment.

Referring to FIGS. 9 to 11, there is shown a valve structure of valves used in the hydraulic pressure supply system 55 of the third embodiment. The third embodiment is different from the first and second embodiments in that the pressure supply system 55 of the third embodiment selectively generates one of three pressures $P_S$, $P_{C1}$ and $P_{C2}$ by varying a combination of respective valve positions of two electromagnetic shut-off valves 59 and 60, although the clutch pressure $P_C$ can be continuously varied in proportion to the magnitude of the exciting current $CS_1$ applied to the solenoid 28b of the electromagnetic valve 28 in the first and second embodiments. As shown in FIG. 9, the oil supply main line of the oil pressure source 21 branches into three oil supply lines 56a, 56b and 56c. The pressure supply system 55 of the third embodiment includes a pressure regulating valve 57 essentially consisting of an internal-and-external-pilot type pressure regulating valve fluidly connected to the branch line 56a, a directional control valve 58 fluidly disposed between the valve 57 and the inlet/outlet port 8 of the clutch 7, a first spring-offset type two-port, two-position electromagnetic shut-off valve 59 fluidly connected to the branch line 56b, and a second spring-offset type two-port, two-position electromagnetic shut-off valve 60 fluidly connected to the branch line 56c and arranged in parallel with the shut-off valve 59. As clearly seen in FIG. 10, the pressure regulating valve 57 includes a substantially cylindrical valve housing 57a defining therein a spool chamber, and an inlet port 57i, an outlet port 57B, an internal-pilot port $57P_1$, an external-pilot port $57P_2$, and another external-pilot port $57P_3$, a valve spool 57e slidably disposed in the spool chamber of the housing 57a, and a return spring 57f operably disposed in one end 57c of the spool chamber to normally force the spool into abutment with the other end 57b of the spool chamber. One end of an internal-pilot line 57g is connected to the oil supply line 56a communicating the outlet port 57B, while the other end of the internal-pilot line 57g is connected to the internal-pilot port $57P_1$ via a fixed orifice 57h. The external-pilot port $57P_2$ receives, via a line 56d, the secondary oil pressure of the shut-off valve 59 which, pressure is essentially equivalent to the line pressure $P_L$ introduced into the valve 59. The external-pilot port $57P_3$ receives, via a line 56e, the secondary oil pressure of the shut-off valve 60, which pressure is essentially equivalent to the line pressure $P_L$ introduced into the valve 60. On the other hand, the directional control valve 58 consists of an internal-and-external pilot type directional control valve. The directional control valve 58 includes a substantially cylindrical valve housing 58a defining therein a spool chamber, and an inlet port 58i, an outlet port 58B, an external-pilot port $58P_1$, and another external-pilot port $58P_2$, a valve spool 58e slidably disposed in the spool chamber of the housing 58a, and a return spring 58f operably disposed in one end 58c of the spool chamber to normally force the spool into abutment with the other end 58b of the spool chamber. The external-pilot port $58P_1$ receives, via a line 56d, the secondary oil pressure $P_L$ of the shut-off valve 59, while the external-pilot port $58P_2$ receives, via a line 56e, the secondary oil pressure $P_L$ of the shut-off valve 60. Assuming that a character $A_3$ denotes an effective pressure receiving area of the lowermost end of the spool 58e facing the external-pilot port $58P_2$, a character $A_4$ denotes an effective pressure receiving area of the intermediate stepped portion of the spool 58e facing the external-pilot port $58P_1$, and a character $F_M$ denotes a downwardly acting spring bias of the spring 58f, the product ($P_L \times A_4$) represents an upward operational force acting on the spool 58e owing to the fluid pressure $P_L$ introduced through the pilot port $58P_1$, and the product ($P_L \times A_3$) represents an upward operational force acting on the spool 58e owing to the fluid pressure $P_L$ introduced through the pilot port $58P_2$. In addition, the bias of the spring 58f is designed so that each of the upward operational forces ($P_L \times A_4$) and ($P_L \times A_3$) exceeds the spring bias $F_M$, that is, $P_L \times A_4 > F_M$ and $P_L \times A_3 > F_M$. With the above arrangement, when the line pressure $P_L$ is fed to at least one of the two lines 56d and 56e by way of the shut-off valves 59 and 60, the spool 58e moves upwards (viewing FIG. 10) against the spring bias, to establish a full fluid communication between the inlet port 58i and the outlet port 58B. Similarly, assuming that a character $A_5$ denotes an effective pressure receiving area of the lowermost end of the spool 57e facing the external-pilot port $57P_3$, a character $A_6$ denotes an effective pressure receiving area of the intermediate stepped portion of the spool 57e facing the external-pilot port $57P_2$, and a character $F_K$ denotes a downwardly acting spring bias of the spring 57f, the product ($P_L \times A_6$) represents an upward operational force acting on the spool 57e owing to the fluid pressure $P_L$ introduced through the pilot port $57P_2$, and the product ($P_L \times A_5$) represents an upward operational force acting on the spool 57e owing to the fluid pressure $P_L$ introduced through the pilot port $57P_3$. In the embodiment, the bias of the spring 57f is designed so that each of the upward operational forces ($P_L \times A_6$) and ($P_L \times A_5$) exceeds the spring bias $F_K$, that is, $P_L \times A_6 > F_K$ and $P_L \times A_5 > F_K$. Additionally, the area $A_5$ is set to be greater than the area $A_6$, that is, $A_5 > A_6$. In the pressure regulating valve 57, since the secondary oil pressure output from the valve 57 itself is introduced into the internal-pilot port $57P_1$, the spool 57e moves at a balanced position in which the resultant force of the spring bias of the spring 57f and a downward operational force acting on the spool 57e owing to the secondary pressure introduced through the internal-pilot port $57P_1$ is balanced to the resultant force of an upward operational force acting on the spool 57e owing to the line pressure $P_L$ introduced through the external-pilot port $57P_2$ and an upward operational force acting on the spool 57e owing to the line pressure $P_L$ introduced through the external-pilot port $57P_3$. Resultingly, the secondary pressure output from the valve 57 can be suitably regulated depending on the line-pressure supply to the pilot port $57P_2$ and/or $57P_3$. As seen in FIG. 9, the normally closed type shut-off valve 59 has a solenoid 59a activated by a control signal $CS_3$ such as a solenoid exciting current generated from the control unit 40, while the normally closed type shut-off valve 60 has a solenoid 60a which is activated by a control signal $CS_4$ such as a solenoid exciting current generated from the control unit 40. The respective shut-off valves 59 and 60 are properly controlled in accordance with an ON-OFF control based on the two control signals $CS_3$ and $CS_4$. Concretely, the pressure supply system 55 of the third embodiment operates as follows.

Under a condition in which the line pressure $P_L$ is supplied from the oil pressure source 21 to the supply lines 56a, 56b and 56c, when the control unit 40 generates only the control signal $CS_3$ to energize the solenoid 59a of the first shut-off valve 59, only the pilot port $57P_2$ receives the line pressure $P_L$. Until the forces acting on the spool 57e are balanced to each other, the spool moves. In other words, the spool moves until the resultant force of the downward operational forces is balanced to the resultant force of the upward operational forces. Assuming that a character Po denotes the secondary pressure output from the valve 57, the equilibrium of force is represented as follows.

$$F_K + (A_5 + A_6)Po = A_6 \times P_L \therefore Po = (A_6 \times P_L - F_K)/(A_5 + A_6)$$

Therefore, in the presence of only the control signal $CS_3$, the secondary pressure Po, which is equivalent to the pressure level defined by $(A_6 \times P_L - F_K)/(A_5 + A_6)$, is fed from the outlet port 57B to the directional control valve 58. The pressure level defined by $(A_6 \times P_L - F_K)/(A_5 + A_6)$ is set to be identical with the previously-noted stand-by pressure $P_S$.

With the line-pressure supply to the system 55, when the control unit 40 generates only the control signal $CS_4$ to energize the solenoid 60a of the second shut-off valve 60, only the pilot port 57P$_3$ receives the line pressure $P_L$. In this case, the equilibrium of force is represented as follows.

$$F_K + (A_5 + A_6)Po = A_5 \times P_L \therefore Po = (A_5 \times P_L - F_K)/(A_5 + A_6)$$

Therefore, in the presence of only the control signal $CS_4$, the secondary pressure Po, which is equivalent to the pressure level defined by $(A_5 \times P_L - F_K)/(A_5 + A_6)$, is fed from the outlet port 57B to the directional control valve 58. The pressure level defined by $(A_5 \times P_L - F_K)/(A_5 + A_6)$ is set to be identical with a pressure value $P_{C1}'$ equal to or greater than the previously-noted clutch pressure $P_{C1}$ and less than the previously-noted clutch pressure $P_{C2}$.

With the line-pressure supply to the system 55, when the control unit 40 generates the two control signals $CS_3$ and $CS_4$ to energize both the solenoids 59a and 60a, the respective pilot ports 57P$_2$ and 57P$_3$ receive the line pressure $P_L$. In this case, the equilibrium of force is represented as follows.

$$F_K + (A_5 + A_6)Po = P_L(A_5 + A_6) \therefore Po = P_L - \{F_K/(A_5 + A_6)\}$$

Therefore, in the presence of both the control signals $CS_3$ and $CS_4$, s the secondary pressure Po, which is equivalent to the pressure level defined by $P_L - \{F_K/(A_5 + A_6)\}$, is fed from the outlet port 57B to the directional control valve 58. The pressure level defined by $P_L - \{F_K/(A_5 + A_6)\}$ is set to be identical with the previously-noted clutch pressure $P_{C2}$. Note that the pressure $P_{C1}'$, which is obtained by generation of the control signal $CS_4$ and defined by $(A_5 \times P_L - F_K)/(A_5 + A_6)$ is set to be greater than the pressure $P_S$ is obtained by generation of the control signal $CS_3$ and defined by $(A_6' P_L - F_K)/(A_5 + A_6)$, because the pressure difference between the pressure value of $(A_5 \times P_L - F_K)/(A_5 + A_6)$ and the pressure value of $(A_6 \times P_L - F_K)/(A_5 + A_6)$ is represented by $(A_5 - A_6) P_L/(A_5 + A_6)$ and the value $(A_5 - A_6) P_L/(A_5 + A_6)$ is positive. Note that the pressure $P_{C2}$, which is obtained by generation of the two control signals $CS_3$ and $CS_4$ and defined by $P_L - \{F_K/(A_5 + A_6)\}$, is set to be greater than the pressure $P_{C1}'$, which is obtained by generation of the control signal $CS_4$ and defined by $(A_5 \times P_L - F_K)/(A_5 + A_6)$, because the pressure difference between the pressure value of $P_L - \{F_K/(A_5 + A_6)\}$ and the pressure value of $(A_5 \times P_L - F_K)/(A_5 + A_6)$ is represented by $A_6 P_L/(A_5 + A_6)$ and the value $A_6 P_L/(A_5 + A_6)$ is positive. As appreciated from the above, the pressure supply system 55 of the third embodiment can provide either one of three kinds of pressure values $P_S$, $P_{C1}$ and $P_{C2}$, in a stepwise manner, as illustrated by (a), (b) and (c) in the table of FIG. 11. As seen in FIG. 11, when only the first shut-off valve 59 is shifted to the full open position (ON state), the stand-by pressure $P_S$ is fed through the system 55 to the inlet/outlet port 8, and thus the clutch 7 is held in the stand-by position. When only the second shut-off valve 60 is shifted to the full open position (ON state), the clutch pressure $P_{C1}'$ is fed through the system 55 to the inlet/outlet port 8, and thus the clutch 7 is engaged softly, so as to provide a predetermined front-and-rear wheel driving-torque distribution ratio corresponding to a medium range between 0 : 100 and 50 : 50. When the shut-off valves 59 and 60 are both shifted to their full open positions, the clutch pressure $P_{C2}$ is fed through the system 55 to the inlet/outlet port 8, and thus the clutch 7 is engaged tightly to provide a predetermined front-and-rear wheel driving-torque distribution ratio of 50 : 50. In the event that the line pressure $P_L$ is unpredictably not supplied to the desired external-pilot ports 57P$_3$ and 58P$_2$ and/or 57P$_2$ and 58P$_1$ owing to electrical abnormality such as breaking of the exciting coil or short-circuit of the solenoid, it will be appreciated that the system 55 serves to supply the clutch pressure $P_C$ being equal to or less than the designated pressure level. For instance, in case that either one of the solenoids 59a and 60a is not activated due to short-circuit though the control unit 40 generates the control signals $CS_3$ and $CS_4$ to the respective solenoids, the secondary pressure $P_S$ or $P_{C1}'$ is less than the pressure $P_{C2}$. In case that the solenoids 59a and 60a are not energized due to short-circuit irrespective of output of the control signals $CS_3$ and $CS_4$ to the respective solenoids, the spool 58e of the directional control valve 58 is kept in the lowermost position (viewing FIG. 10), i.e., at the valve closed position, and thus there is no oil-pressure supplied to the inlet/outlet port 8 of the transfer 6. In this manner, the vehicle is held at the rear-wheel drive mode. That is, the system 55 of the third embodiment can also provide an effective fail-safe function in case of failure in an electrical system in the control unit.

Fourth embodiment

Figure 12:
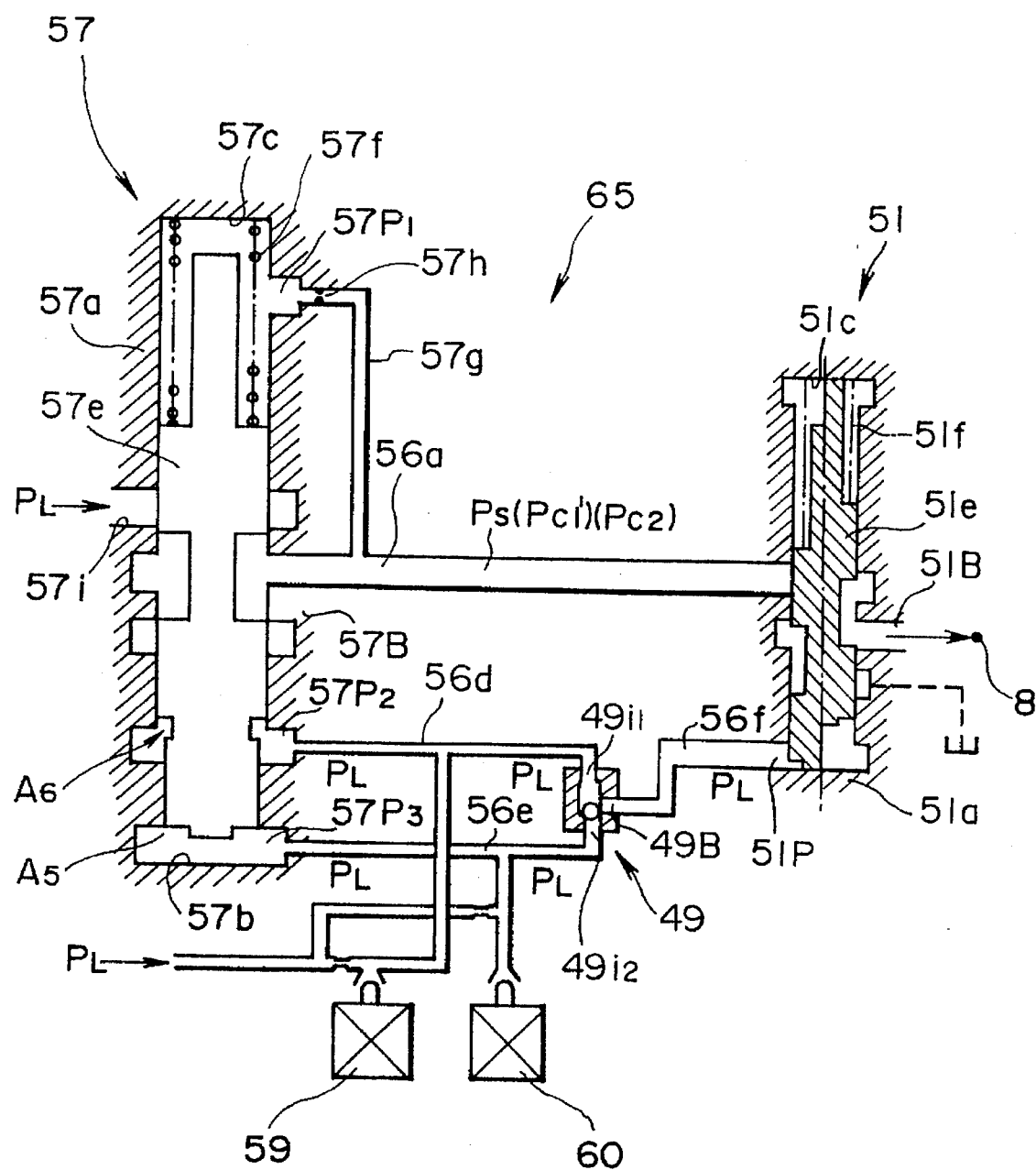
FIG. 12 is a longitudinal cross-sectional view illustrating a valve structure of a hydraulic pressure supply system of a fourth embodiment.

Referring now to FIG. 12, there is shown a valve structure of valves used in the hydraulic pressure supply system 65 of the fourth embodiment. The basic construction of the pressure supply system 65 of the fourth embodiment shown in FIG. 12 is similar to that of the third embodiment shown in FIGS. 9 and 10. Therefore, the same reference numerals used in the third embodiment of FIG. 10 will be applied to the corresponding elements used in the fourth embodiment of FIG. 12, for the purpose of comparison between the third and fourth embodiments. The fourth embodiment is different from the third embodiment in that a valve structure of a directional control valve 51 employed in the system 65 of the fourth embodiment is simplified as compared with the directional control valve 58 employed in the system 55 of the third embodiment, and that the two inlet ports $49_{i1}$ and $49_{i2}$ of the shuttle valve 49 previously explained in the second embodiment are connected to the respective pilot ports 57P$_2$ and 57P$_3$ of the pressure regulating valve 57 so as to introduce a higher one of the two incoming pressures into the external-pilot port 51P of the valve 51. In the third, fourth and fifth embodiments, although the secondary pressure of the first shut-off valve 59 and the secondary pressure of the second shut-off valve 60 are both represented as a pressure equivalent to the line pressure $P_L$, for the purpose of simplification of the disclosure, in actual, the magnitude of the secondary pressure of the first shut-off valve 59 is slightly different from that of the second shut-off valve 60 owing to the difference of flow resistance between the respective lines 56d and 56e or the like. Thus, the shuttle valve 49 can supply the higher one of the two incoming pressures, respectively generated from the shut-off valves 59 and 60. The system 65 of the fourth embodiment operates as follows.

With the line-pressure supply to the system 65, when the control unit 40 generates only the control signal $CS_3$ to energize the solenoid 59a of the first shut-off valve 59, only the pilot port 57P$_2$ receives the secondary pressure $P_L$ of the valve 59. The secondary pressure $P_L$ of the valve 59 is also supplied via the shuttle valve 49 to the pilot port 51P of the directional control valve 51, and as a result the spool 51e moves upwards against the bias of the spring 51f, thereby establishing a full fluid communication between the inlet port 51i and the outlet port 51B. In this case, since the valve 57 regulates the incoming pressure $P_L$ at the stand-by pressure $P_S$, the stand-by pressure $P_S$ is fed through the valves 57 and 51 to the inlet port 8 of the transfer. With the line-pressure supply to the system 65, when the control unit 40 generates only the control signal $CS_4$ to energize the solenoid 60a of the second shut-off valve 60, only the pilot port 57$P_3$ receives the secondary pressure $P_L$ of the valve 60. The secondary pressure $P_L$ of the valve 60 is also supplied via the shuttle valve 49 to the pilot port 51P, and as a result the spool 51e moves upwards against the spring bias, thereby establishing a full fluid communication between the inlet port 51i and the outlet port 51B. In this case, since the valve 57 regulates the incoming pressure $P_L$ at the first clutch pressure $P_{C1}'$, the clutch pressure $P_{C1}'$ is fed to the inlet/outlet port 8. With the line-pressure supply to the system 65, when the control unit 40 generates the two control signals $CS_3$ and $CS_4$ to energize both the solenoids 59a and 60a, the pilot ports 57$P_2$ and 57$P_3$ receive the respective secondary pressures generated from the shut-off valves 59 and 60. The higher one of the two incoming pressures fed to the inlet ports $49_{i1}$ and $49_{i2}$ of the shuttle valve 49 is selectively supplied to the pilot port 51P, and as a result the spool 51e moves upwards against the spring bias, thereby establishing a full fluid communication between the inlet port 51i and the outlet port 51B. In this case, since the valve 57 regulates the incoming pressure $P_L$ at the first clutch pressure $P_{C2}$, the clutch pressure $P_{C2}$ is fed to the inlet/outlet port 8. As set forth above, the system 65 of the fourth embodiment can also provide the same effect as the system 55 of the third embodiment.

Fifth embodiment

Figure 13:
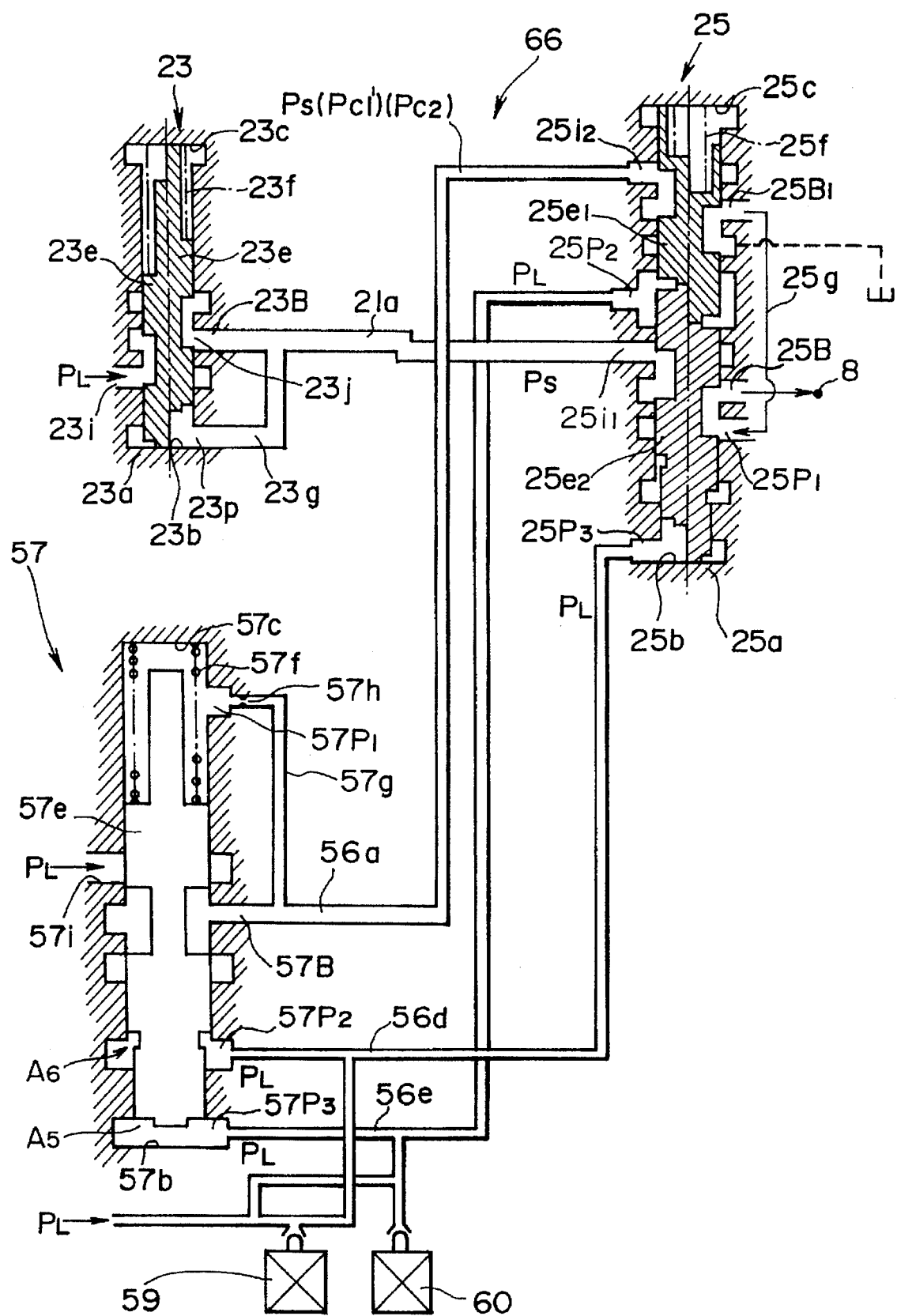
FIG. 13 is a longitudinal cross-sectional view illustrating a valve structure of a hydraulic pressure supply system of a fifth embodiment.

Referring now to FIG. 13, there is shown a valve structure of valves used in the hydraulic pressure supply system 66 of the fifth embodiment. The fifth embodiment is different from the third embodiment in that the directional control valve 58 of the third embodiment is replaced with the directional control valve 25 as explained in the first embodiment, and that the stand-by pressure valve 23 is added in the system 66 of the fifth embodiment for the purpose of provision of a more precise pressure value with respect to the stand-by pressure $P_S$. The system 66 of the fifth embodiment operates as follows.

With the line pressure supply to the system 66, when the control unit 40 generates only the control signal $CS_3$ to energize the solenoid 59a of the first shut-off valve 59, only the pilot port 57$P_2$ receives the secondary pressure $P_L$ of the valve 59. The secondary pressure $P_L$ of the valve 59 is also supplied via the line 56d to the external-pilot port 25$P_3$ of the directional control valve 25, and as a result the two spools $25_{e1}$ and $25_{e2}$ move upwards against the bias of the spring 25f, thereby establishing a full fluid communication between the inlet port 25i and the outlet port 25B. For the reasons as indicated above, since the pressure regulating valve 57 regulates the incoming pressure $P_L$ at the stand-by pressure $P_S$, the stand-by pressure $P_S$ is fed from the valve 57 to the line 56a. Since the two spool $25_{e1}$ and $25_{e2}$ are held uppermost position under the pilot pressure $P_L$ introduced into the pilot port 25$P_3$ and thus a fluid communication between the ports 25$B_1$ and 25B is blocked, the stand-by pressure $P_S$ produced by the pressure regulating valve 57 is not fed through the valve 25 to the inlet/outlet port 8 of the transfer. Alternatively, another stand-by pressure $P_S$, which is produced by the stand-by pressure valve 23 and precisely reduced at a pressure level of $P_S$, is fed through the line 21a, the inlet/outlet port 25i, and the outlet port 25B to the inlet port 8 of the transfer 6, in that order.

With the line pressure supply to the system 66, when the control unit 40 generates only the control signal $CS_4$ to energize the solenoid 60a of the second shut-off valve 60, only the pilot port 57$P_3$ receives the secondary pressure $P_L$ of the valve 60. Therefore, the valve 57 generates the clutch pressure $P_{C1}'$ to the line 56a. The secondary pressure $P_L$ of the valve 60 is also fed via the line 56e to the external-pilot port 25$P_2$, and, on the one hand, the spool $25_{e1}$ moves upwards and, on the other hand, the spool $25_{e2}$ is kept in the lowermost position. Under this condition, the clutch pressure $P_{C1}'$ produced by the valve 57 is fed through the line 56a, the inlet port $25_{i2}$, the internal outlet port 25$B_1$, the pilot line 25$_g$, the internal-pilot port 25$P_1$ and the outlet port 25B to the inlet/outlet port 8 of the transfer.

With the line-pressure supply to the system 66, when the control unit 40 generates the two control signals $CS_3$ and $CS_4$ to energize both the solenoids 59a and 60a, the pilot ports 57$P_2$ and 57$P_3$ receive the respective secondary pressures generated from the shut-off valves 59 and 60. For the reasons as indicated above, the valve 57 outputs the clutch pressure $P_{C2}$ to the line 56a, and in addition the two spool $25_{e1}$ and $25_{e2}$ are held in axially spaced relationship with each other owing to an equilibrium of forces acting on the spools. Thus, the clutch pressure $P_{C2}$ is fed through the line 56a, the inlet port $25_{i2}$, the internal outlet port 25$B_1$, the pilot line 25$_g$, the internal-pilot port 25$P_1$ and the outlet port 25B to the outlet port 8 of the transfer. As appreciated, the system 66 of the fifth embodiment can also provide the same effect as the system 55 of the third embodiment. Additionally, since the system 66 of the fifth embodiment incorporates the same stand-by pressure valve 23 as the system 20 of the first embodiment, the system 66 can provide the precise stand-by pressure value $P_S$ to the transfer clutch 7.

In the third, fourth and fifth embodiments, although the two electromagnetic shut-off valves 59 and 60 are used to generate three kinds of pressures $P_S$, $P_{C1}'$ and $P_{C2}$, three or more electromagnetic shut-off valves may be used to be capable of generating four or more kinds of clutch pressures in a stepwise manner.

Sixth embodiment

Figure 14:
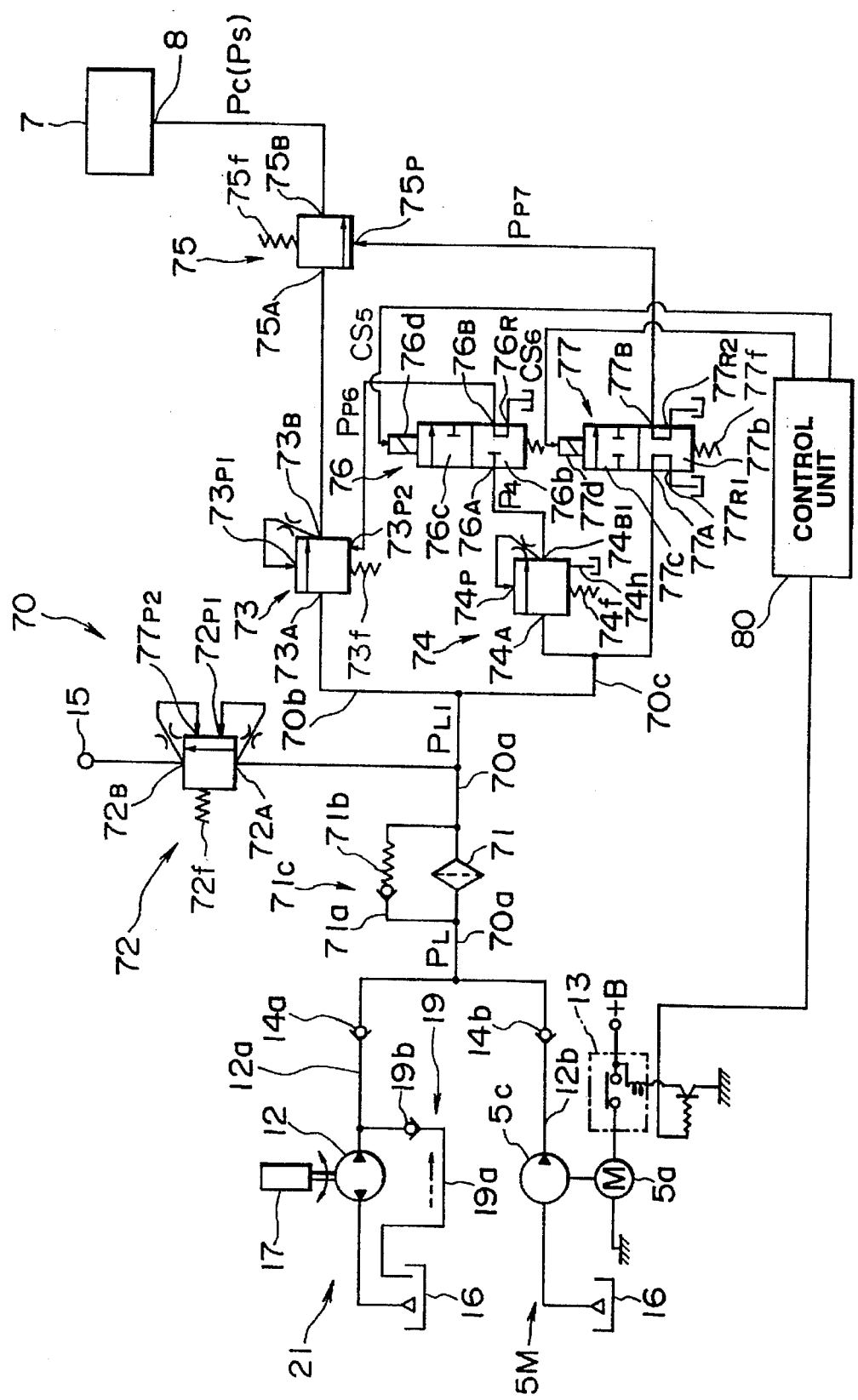
FIG. 14 is a schematic block diagram illustrating a sixth embodiment of a hydraulic pressure supply system according to the invention.

Referring now to FIGS. 14, and 15A to 15D, there are shown a hydraulic circuit diagram of the pressure supply system 70 and a detailed valve structure of various valves 72, 73, 74 and 75 provided in the system 70 of the sixth embodiment. The transfer-clutch pressure supply system 70 of the sixth embodiment is different from the system 20 of the first embodiment, in that the system 70 of the sixth embodiment has two different oil pressure sources, either one of which is selectable depending on whether the vehicle is conditioned in the forward driving state or the backward driving state, and on whether the vehicle is conditioned at a low-speed running state or at a high-speed running state or the vehicle stops. In addition, the system 70 of the sixth embodiment is essentially different from the systems 20, 48, 55, 65 and 66 of the first to fifth embodiments, in that a duty-cycle (duty-ratio) controlled 3-port, 2-position electro-magnetic solenoid type pressure control valve 76 is provided for optimally adjusting a clutch pressure $P_C$ fed to the inlet/outlet port 8 of the transfer clutch 7, according to a selected duty cycle. As seen in FIG. 14, the pressure supply system 70 of the sixth embodiment has a first oil pressure source 21 with a first reversible fluid pressure pump 12 having a driven connection with the output shaft 17 of the transmission 3a, and a second oil pressure source 5M with an electrical motor-driven single directional-flow type fluid pressure pump 5c having a driven connection with an electrical motor 5a. The first pump is a relatively small-sized mechanical pump, which is in general mounted easily on the vehicle. The second oil pressure source 5M is arranged in parallel with the first oil pressure source 21. The second oil pressure source 5M is controlled in accordance with an ON-OFF control based on a control signal applied to a transistor electrically connected to a normally-open type relay 13. As appreciated from FIG. 14, when the control unit 80 generates a control signal (a motor drive instruction) to the transistor and then the exciting coil of the relay 13 is activated, a current is supplied from the positive terminal +B of the car battery through the relay 13 to the motor 5a for rotation of the motor. When the control unit 80 generates a motor stop instruction, the motor 5a is de-energized. The second motor-driven pump 5c is provided as an auxiliary pump, which is used to supply a satisfactory fluid pressure equal to or greater than a predetermined line pressure level in case that a fluid pressure produced by the first pump 12 doesn't reach to the predetermined line pressure level. The outlet port of the motor-driven pump 5c is fluidly connected via a line 12b and a one-way check valve 14b to an oil pressure supply line 70a. On the other hand, the outlet port of the first reversible pump 12 is fluidly connected via a line 12a and an one-way check valve 14a to the supply line 70a. In the system 70 of the sixth embodiment, a bypass circuit 19 is arranged in parallel with the first reversible pump 12, to ensure an effective oil-film lubrication at a rotational portion of the first pump 12 during reverse rotation of the pump 12. The bypass circuit 19 includes a bypass line 19a and an one-way check valve 19b fluidly disposed in the bypass line 19a. The bypass line 19a is fluidly disposed between the oil reservoir 16 and the upstream port of the pump 12 or the line 12a connected to the upstream port of the pump 12. During reverse rotation of the first pump 12, the bypass circuit 19 serves to cause recirculating fluid flow according to which working fluid recirculates from the reservoir 16 through the bypass line 19a and the pump 12 via the check valve 19b back to the reservoir. Fluidly disposed in the supply line 70a is an oil filter 71. Another bypass circuit 71c is arranged in parallel with the oil filter 71 to ensure a sufficient line pressure supply, even in case of filter clogging. The bypass circuit 71c includes a bypass line 71a which is, at one end, connected to the inlet port of the filter 71 and, at the other end, connected to the outlet port of the filter 71. A line-pressure regulating valve 72 is connected to the supply line 70a upstream of the filter 71, for regulating the incoming line pressure $P_L$ at a constant pressure level $P_{L1}$. The supply line 70a branches into two branch lines 70b and 70c. A clutch pressure regulating valve 73 is fluidly connected to the branch line 70b, while a pilot valve 74 is fluidly connected to the branch line 70c. A directional control valve 75 is fluidly disposed between the outlet port of the clutch pressure regulating valve 73 and the inlet/outlet port 8 of the transfer. An inlet port 76A of the duty-ratio controlled 3-port, 2-position electromagnetic solenoid type pressure control valve 76 is connected to the outlet port 74$B_1$ of the pilot valve 74. An inlet port 77A of a spring-offset type 4-port, 2-position electromagnetic shut-off valve 77 is connected to the branch line 70c. With the shut-off valve 77 held in the spring-loaded position 77b (valve closed position), the valve 77 functions to relieve the incoming pressure $PL_1$ fed to the inlet port 74A of the pilot valve 74. A secondary pressure output from the pressure control valve 76, that is, a controlled pressure $P_{P6}$ is supplied to an external-pilot port 73$P_2$ of the pressure regulating valve 73 as a pilot pressure acting in the same operational direction as the bias of a return spring 73f disposed in the valve 73. On the other hand, a secondary pressure output from the shut-off valve 77, that is, an outgoing pressure $P_{P7}$ is supplied to an external-pilot port 75P of the directional control valve 75 as a pilot pressure acting in the reverse operational direction against the bias of the return spring 75f disposed in the valve 75.

Figure 15:
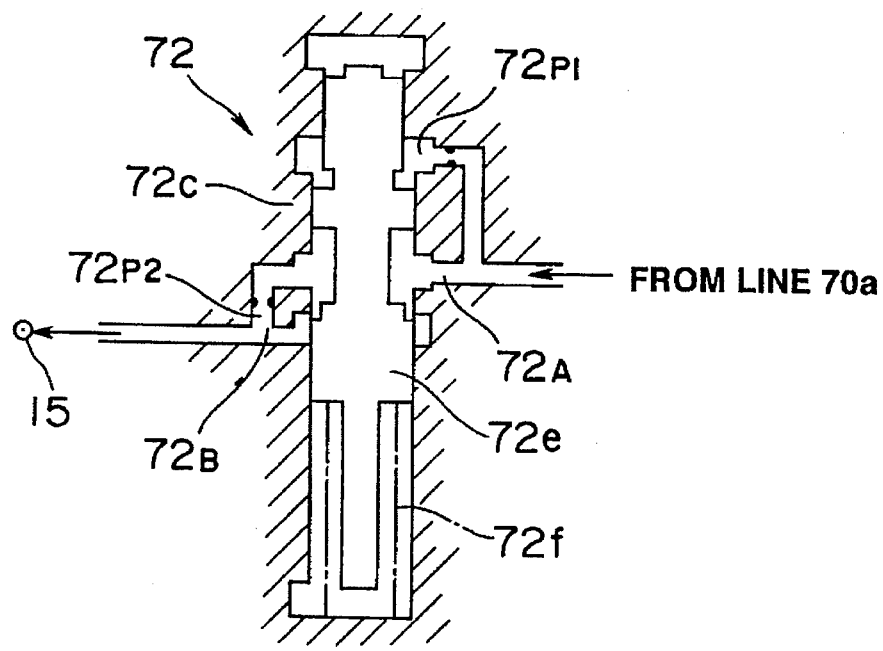
FIG. 15A is a longitudinal cross-sectional view illustrating a valve structure of an internal-pilot type line pressure regulating valve provided in the pressure supply system of the sixth embodiment.
FIG. 15B is a longitudinal cross-sectional view illustrating a valve structure of an internal-and-external pilot type clutch pressure regulating valve provided in the pressure supply system of the sixth embodiment.
FIG. 15C is a longitudinal cross-sectional view illustrating a valve structure of an internal-pilot type pressure regulating valve provided in the pressure supply system of the sixth embodiment.
FIG. 15D is a longitudinal cross-sectional view illustrating a valve structure of a normally-open type directional control valve provided in the pressure supply system of the sixth embodiment.
Figure 15:
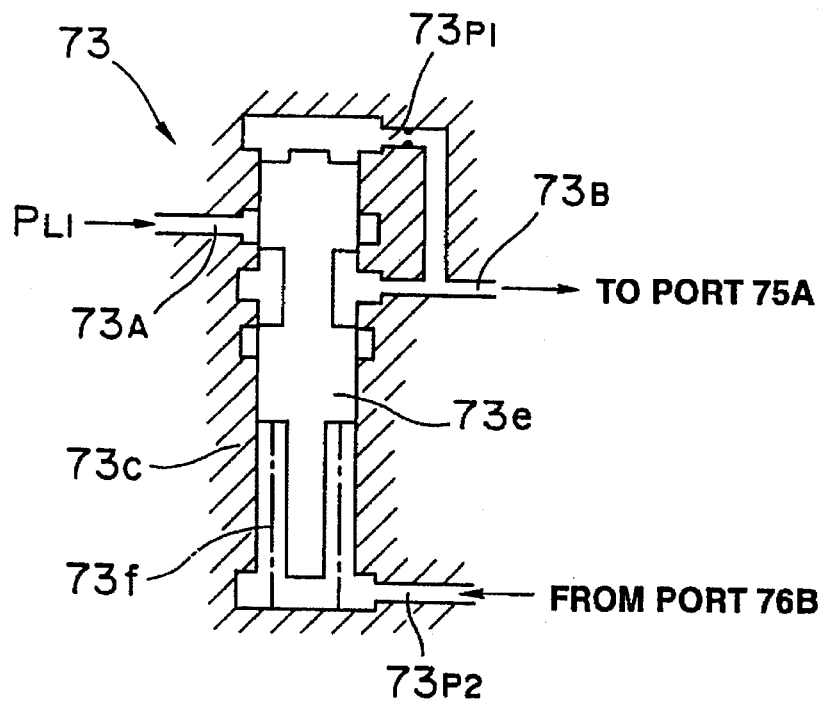

Referring to FIGS. 15A to 15D, particularly to FIG. 15A, the line-pressure regulating valve 72 essentially consists of an internal-pilot type relief valve. The valve 72 includes a substantially cylindrical valve housing 72c which housing defines therein a spool chamber, an inlet port 72A, an outlet port 72B, and a pair of internal-pilot ports 72$P_1$ and 72$P_2$, and a valve spool 72e slidably disposed in the spool housing of the housing 72c, and a return spring 72f operably disposed in one end of the spool chamber to normally force the spool into abutment with the other end of the spool chamber. The internal-pilot port 73$P_1$ receives a primary pressure, i.e., the incoming pressure fed to the valve 72 via a fixed orifice, while the internal-pilot port 73$P_2$ receives a secondary pressure, i.e., the outgoing pressure generated from the valve 72 via another fixed orifice. The pressure level of the pressurized fluid pressure $P_L$, which pressure is produced by the first pump 12 or by the second pump 5c and fed to the supply line 70a, is regulated and reduced at a predetermined line pressure level $P_{L1}$ by way of the valve 72. During pressure regulating operation of the valve 72, the working fluid flowing out of the valve 72 is fed to a lubricating system 15 of the vehicle. The properly regulated line pressure $P_{L1}$ is fed via the lines 70b and 70c respectively to the clutch pressure regulating valve 73 and the pilot valve 74.

As seen in FIG. 15B, the clutch pressure regulating valve 73 essentially consists of an internal-and-external pilot type pressure regulating valve. The valve 73 includes a substantially cylindrical valve housing 73c defining therein a spool chamber, an inlet port 73A, an outlet port 73B, an internal-pilot port 73$P_1$, and a variable-pressure external-pilot port 73$P_2$, a valve spool 73e slidably disposed in the spool chamber of the housing 73c, and a return spring 73f operably disposed in one end of the spool chamber to normally force the spool into abutment with the other end of the spool chamber. A hydraulic pressure, which is introduced via the fixed orifice into the internal-pilot port 73$P_1$, functions as a pilot pressure acting in the reverse direction against the return spring 73f of the valve 73. The variable-pressure external-pilot port 73$P_2$ receives the controlled pilot pressure $P_{P6}$ is produced by the pressure control valve 76 and varies in response to a control signal $CS_5$ generated by the control unit 80, as explained later. When the line pressure $P_{L1}$ is supplied through the inlet port 73A to the pressure regulating valve 73, the pilot pressure introduced into the upper end of the spool chamber via the internal-pilot port 73$P_1$ cause the spool 73e to move downwards (viewing FIG. 15B) against a resultant force of the bias of the spring 73f and the controlled pilot pressure $P_{P6}$ introduced into the external-pilot port 73$P_2$. The spool 73e moves downwards until the resultant force of the spring bias and the controlled variable pressure $P_{P6}$ is balanced to the pilot pressure introduced into the internal-pilot port 73$P_1$, with the result that the spool 73e is maintained at the balanced position. As a result, a variable orifice portion of the outlet port 73B is set to a predetermined opening degree, i.e., a predetermined constricting rate. The opening degree of the variable orifice of the outlet port 73B is increased as the magnitude of the pilot pressure $P_{P6}$ produced by the valve 76 is increased. Thus, the incoming line pressure $P_{L1}$ is suitably adjusted in proportion to the magnitude of the controlled variable pressure $P_{P6}$. The outgoing pressure, which is adjusted in proportion to the magnitude of the pilot pressure $P_{P6}$ fed to the external-pilot port 73$P_2$, corresponds to the previously-noted controlled clutch pressure $P_C$, within a predetermined clutch pressure range of $P_{C1}$ to $P_{C2}$. In the absence of supply of the controlled pilot pressure $P_{P6}$ to the external-pilot port $73P_2$, the spool is held at a predetermined balanced position is determined owing to an equilibrium of forces acting on the spool, namely the bias of the spring $73f$ and the pilot pressure fed through the internal-pilot port $73P_1$. The spring bias of the spring $73f$ is designed so that, at the balanced position, the incoming line pressure $P_{L1}$ is decreasingly adjusted at a pressure level slightly less than a predetermined clutch pressure level $P_{C1}$ at which the transfer clutch starts to be engaged. The decreasingly adjusted secondary pressure, which is obtained through the force-equilibrium between the spring bias and the pilot pressure introduced into the internal-pilot port $73P_1$ and generated from the outlet port 73B of the clutch pressure regulating valve 73, corresponds to the previously-noted stand-by pressure $P_S$.

Figure 15C:
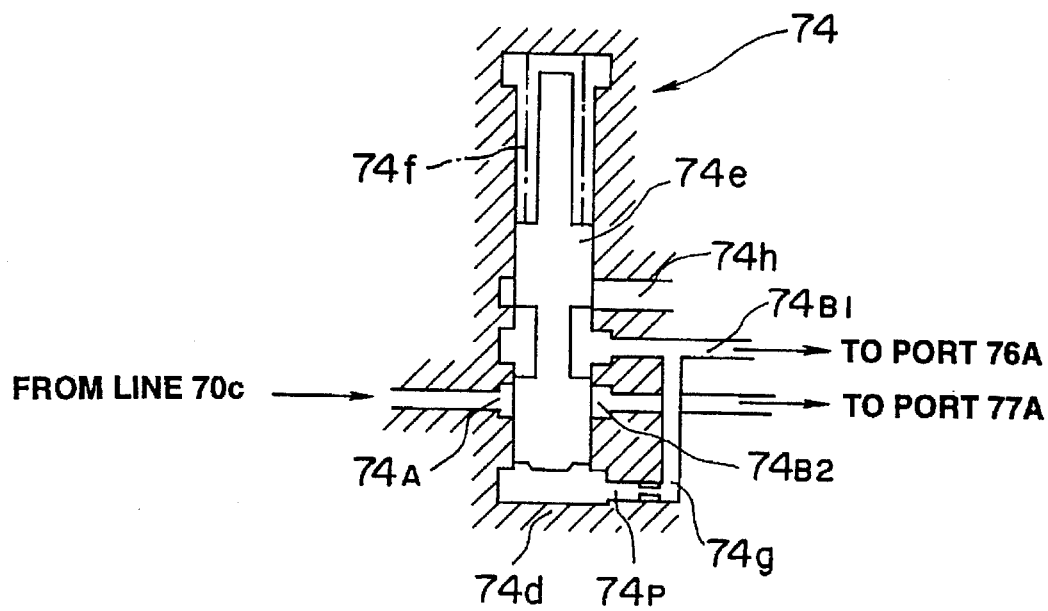

Referring to FIG. 15C, the pilot valve 74 essentially consists of an internal-pilot type pressure reducing valve. The pilot valve 74 includes a substantially cylindrical valve housing $74d$ defining therein a spool chamber, an inlet port 74A, a first outlet port $74B_1$, a second outlet port $74B_2$, an internal-pilot port 74P, and a drain port $74h$, a valve spool $74e$ slidably disposed in the spool chamber of the housing $74d$, and a return spring $74f$ operably disposed in one end of the spool chamber to normally force the spool into abutment with the other end of the spool chamber. The first outlet port $74B_1$ is fluidly connected to the inlet port 76A of the duty-ratio controlled electromagnetic valve 76, while the second outlet port $74B_2$ is fluidly connected to the inlet port 77A of the electromagnetic shut-off valve 77. The internal-pilot port 74P receives the outgoing secondary pressure output from the first outlet port $74B_1$ via the fixed orifice fluidly disposed in a pilot line $74_g$ as a pilot pressure $P_4$. A hydraulic pressure, which is introduced via the fixed orifice into the internal-pilot port 74P, functions as the pilot pressure $P_4$ acting in the reverse direction against the return spring $74f$ of the valve 74. When the line pressure $P_{L1}$ is supplied through the inlet port 74A to the pilot valve 74, the pilot pressure introduced into the lower end of the spool chamber via the internal-pilot port 74P causes the spool $74e$ to move upwards (viewing FIG. 15C) against the bias of the spring $74f$. Resultingly, the spool is held at a balanced position to produce the pilot pressure $P_4$, which is decreasingly adjusted at a predetermined constant pressure level. The pilot pressure $P_4$ is fed to the inlet port 76A of the duty-ratio controlled electromagnetic valve 76. As seen in FIG. 15C, the second outlet port $74B_2$ communicates permanently with the inlet port 74A of the pilot valve 74 to supply the incoming regulated line pressure $P_{L1}$ through the inlet port 74A and the second outlet port $74B_2$ to the inlet port 77A of the shut-off valve 77.

As shown in FIG. 14, the duty-ratio controlled electromagnetic solenoid type pressure control valve 76 includes the inlet port 76A connected to the first outlet port $74B_1$ of the pilot valve 74, a drain port 76R connected to the oil reservoir, and the outlet port 76B connected to the external-pilot port $73P_2$ of the clutch pressure regulating valve 73. Although it is not clearly shown in FIG. 14, the electromagnetic solenoid valve 76 includes a valve spool slidably enclosed in its valve housing and a single solenoid $76d$. The spool is movable between two positions as indicated by the two blocks in FIG. 14, namely a first position $76b$ at which a fluid communication between the outlet port 76B and the drain port 76R is established, and a second position $76c$ at which a fluid communication between the inlet port 76A and the outlet port 76B. Note that the electromagnetic solenoid valve 76 is controlled in response to the control signal $CS_5$ generated by the control unit 80, at a predetermined duty cycle. When the solenoid $76d$ of the valve 76 is energized in response to the control signal $CS_5$ essentially equivalent to a pulse signal having a controllable pulse width and a controllable frequency, ON/OFF states of the solenoid $76d$ are cyclically repeated at a duty cycle (duty ratio), which is controllable by the control unit 80. In other words, the opening degree of the valve 76 or the secondary pressure $P_{P6}$ output from the outlet port 76B is controllable in proportion to a predetermined time allocation of the On state to the OFF state. The magnitude of the pilot pressure $P_{P6}$ is adjustable by changing the duty cycle of the control signal $CS_5$ generated by the control unit 80, with the result that the clutch pressure $P_C$ produced by the clutch pressure regulating valve 73 can be adjusted within a desirable pressure range of $P_{C1}$ (corresponding to a front-and-rear wheel driving torque ratio 0 : 100) to $P_{C2}$ (corresponding to a front-and-rear wheel driving torque ratio 50 : 50). As appreciated, in case of the duty ratio of 0%, since there is no supply of the pilot pressure $P_{P6}$ to the pilot port $73P_2$ of the pressure regulating valve 73, the opening degree of the variable orifice portion of the outlet port 73B becomes set at a minimum, and thus the stand-by pressure $P_S$ is produced by the valve 73. On the other hand, in case of the duty ratio of 100%, since there is supply of the highest possible pilot pressure $P_{P6}$ to the pilot port $73P_2$ of the pressure regulating valve 73, the opening degree of the variable orifice portion of the outlet port 73B becomes set at a maximum, and thus the clutch pressure $P_{C2}$ is produced by the valve 73. It is preferable that a dither current that oscillates according to a certain duty cycle is constantly applied to the solenoid $76d$ to induce a slight oscillation of the solenoid plunger of the solenoid $76d$. Such micro-vibration of the solenoid plunger is advantageous to prevent undesirable hysteresis of the controlled pilot pressure $P_{P6}$ owing to sliding resistance of the spool enclosed in the valve 76 and to enhance a responsiveness of the pressure control valve 76. As appreciated from the above, the greater the duty ratio becomes, the greater the clutch pressure $P_C$ from the valve 73 is increased toward the pressure level $P_{C2}$.

As seen in FIG. 14, the spring-offset type electromagnetic shut-off valve 77 includes the inlet port 77A receiving the regulated line pressure $P_{L1}$ via the second outlet port $74B_2$ of the pilot valve 74, the outlet port 77B connected to the external-pilot port 75P of the directional control valve 75, and two drain ports $77R_1$ and $77R_2$ both connected to the oil reservoir. Although it is not clearly shown in FIG. 14, the electromagnetic shut-off valve 77 includes a valve spool slidably enclosed in its valve housing and a single solenoid $77d$. The spool (not shown) is movable between two positions as indicated by the two blocks in FIG. 14, namely a first position $77b$ at which a fluid communication between the inlet port 77A and the first drain port $77R_1$ and a fluid communication between the outlet port 77B and the second drain port $77R_2$ are both established, and a second position $77c$ at which a fluid communication between the inlet port 77A and the outlet port 77B. The shut-off valve 77 has a return spring $77f$ operably arranged in the valve housing, to normally hold the valve 77 in the first position. When the control unit 80 generates a control signal $CS_6$ essentially corresponding to a solenoid exciting current, the solenoid $77d$ is energized and thus the shut-off valve 77 is shifted to the second valve position $77c$, and whereby the secondary pressure, i.e., the outgoing pressure $P_{P6}$ generated from the valve 77 is supplied to the external-pilot port 75P of the directional control valve 75. In contrast to the above, in the absence of output of the control signal $CS_6$ from the control unit 80, the solenoid $77d$ is de-energized, and as a result the shut-off valve 77 is held in the spring-bias position, i.e., the first valve position 77b. In this case, the shut-off valve 77 acts to prevent supply of the pilot pressure $P_{P7}$ to the external-pilot port 75P of the directional control valve 75.

Figure 15D:
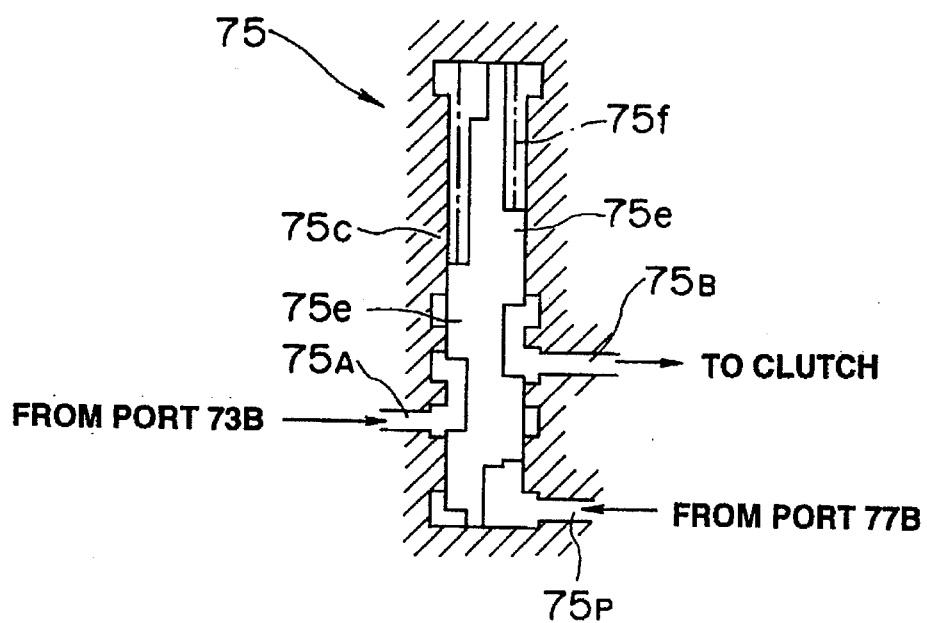

Referring to FIG. 15D, the directional control valve 75 essentially consists of an external-pilot type directional control valve. The valve 75 includes a substantially cylindrical valve housing 75c defining therein a spool chamber, an inlet port 75A, an outlet port 75B, and an external-pilot port 75P, a valve spool 75e slidably disposed in the spool chamber of the housing 75c, and a return spring 75f operably disposed in one end of the spool chamber to normally force the spool into abutment with the other end of the spool chamber. The inlet port 75A receives the secondary pressure output from the clutch pressure regulating valve 73, i.e., the clutch pressure $P_C$. The outlet port 75B is connected to the inlet/outlet port 8 of the transfer clutch 7 to supply the clutch pressure $P_C$ into the latter. The external-pilot port 75P receives the secondary pressure output from the shut-off valve 77, i.e., the pilot pressure $P_{P7}$. In the absence of supply of the pilot pressure $P_{P7}$ to the external-pilot port 75P, the spool 75e is held in the lowermost position (viewing FIG. 15D) by way of the bias of the spring 75f, and resultingly a full fluid communication between the two ports 75A and 75B is established. In this case, the incoming clutch pressure $P_C$ fed into the inlet port 75A is fed through the valve 75 to the inlet port 8 of the transfer clutch. In contrast, in the presence of supply of the pilot pressure $P_{P7}$ to the pilot port 75P, the spool 75e moves upwards against the spring bias, with the result that the fluid communication between the two ports 75A and 75B is blocked.

The hydraulic pressure supply system 70 of the sixth embodiment operates as follows.

During straight-ahead driving at a low speed or during idling, the control unit 80 generates the motor drive instruction to drive the electrical motor 5a, since the pressurized fluid pressure produced by the first reversible pump 12 cannot reach to a predetermined pressure level. At this time, since the control unit 80 does not yet generate the control signal $CS_5$ to the duty-ratio controlled electromagnetic pressure control valve 76, there is no supply of the pilot pressure $P_{P6}$ to the external-pilot port 73$P_2$ of the pressure regulating valve 73. In addition, since the control unit 80 does not yet generate the control signal $CS_6$ to the shut-off valve 77, there is no supply of the pilot pressure $P_{P7}$ to the external-pilot port 75P of the directional control valve 75. The second fluid pump 5c, which has a driven connection with the motor 5a, sucks working fluid from the reservoir 16, and increases a fluid pressure of the sucked working fluid at a predetermined line pressure level $P_L$ depending on a revolution speed of the motor. The line pressure $P_L$ is regulated and reduced at a substantially constant pressure level $P_{L1}$ by way of the line pressure regulating valve 72. The regulated line pressure $P_{L1}$ is fed both to the clutch pressure regulating valve 73 and the pilot valve 74. In the absence of supply of the pilot pressure $P_{P6}$, the line pressure $P_{L1}$ fed to the valve 73 is further regulated at the stand-by pressure $P_S$ through the valve 73 and thereafter the stand-by pressure $P_S$ is fed through the fully opened directional control valve 75 to the inlet/outlet port 8 of the transfer clutch. As a result, the transfer clutch 7 is held in the stand-by position, and whereby the vehicle is held at the rear-wheel drive mode.

During straight-ahead driving at a medium or high speed, the control unit 80 generates the motor stop instruction to deactivate the electrical motor 5a, since the pressurized fluid pressure produced by the first reversible pump 12 can reach to a predetermined pressure level by way of rotation of the output shaft 17 of the transmission. The first pump 12, which has a driven connection with the transmission output shaft 17, provides a sufficiently pressurized working fluid to the supply line 70a. A fluid pressure level of the pressurized working fluid fed to the line 70a is regulated and reduced at the predetermined line pressure level $P_{L1}$ by means of the internal-pilot type pressure regulating valve 72. In this case, since the control unit 80 does not yet output the control signals $CS_5$ and $CS_6$ to the duty-ratio controlled electromagnetic valve 76 and the electromagnetic shut-off valve 77, respectively, the clutch pressure regulating valve 73 regulates the incoming fluid pressure $P_{L1}$ at the stand-by pressure $P_S$, while the directional control valve 75 is held in the full open position. Thus, the stand-by pressure $P_S$ is supplied through the valve 75 to the inlet/outlet port 8 of the transfer clutch, and consequently the clutch 7 is held in the stand-by position in which the vehicle is maintained at the rear-wheel drive mode.

In the event that the vehicle travels in the backward direction, the control unit 80 generates the motor drive instruction to activate the motor 5c. In the same manner as during straight-ahead driving at a low speed, the stand-by pressure $P_S$ is supplied to the transfer-clutch inlet/outlet port 8 by way of the valve 73, and thus the vehicle is conditioned at the rear-wheel drive mode. In this case, the first reversible pump 12 is also rotated in the reverse rotational direction owing to reverse rotation of the transmission output shaft. The reverse rotation of the first pump 12 produces a vacuum in the suction-side fluid line 12a of the first pressure source 21. At this time, the bypass circuit 19 provided in the system 70 of the sixth embodiment, functions to deliver working fluid stored in the reservoir 16 through the bypass line 19a and the opened one-way check valve 19b to the suction-side port of the pump 12. This prevents deficient oil film at the rotating portion of the pump 12 and also prevents occurrence of cavitation at the suction side of the pump 12. Thus, bubbles fed through the first pump 12 into the reservoir 16 can be reduced at a minimum during reverse rotation of the pump 12. In the event that undesirable bubbles have been introduced into the reservoir 16 through the pump 12 during reverse rotation and resultingly the working fluid containing air has been introduced into the cylinder chamber 7f of the transfer clutch 7, such undesirable air contained in the working fluid can be extracted through the annular clearance type air bleed 7L. In addition, since the residual-air capturing chamber 7g of the air bleed 7L functions such that the residual air present in the cylinder chamber 7f is moved in the vicinity of the outer perimeter of the clutch piston 7e and captured by the capturing chamber 7g, a precise application of the clutch pressure $P_C$ on the clutch piston 7e can be assured, without providing surging motion of the clutch piston 7e that alternately moves forward and aft. As appreciated from the above, the system 70 can provide a high-accuracy of transfer-clutch pressure control, by virtue of the air bleed 7L and the bypass circuit 19.

In the event that the vehicle driving state is shifted from a straight-ahead driving state on high-friction roads for instance dry pavements to a straight-ahead driving on low-friction roads for instance snow, wet or icy roads, or shifted from a coasting state to a quick accelerating state, the rear drive wheels 2RR and 2RL may experience wheel slip. In this case, since the detected rear-wheel speed exceeds the detected front-wheel speed, the control unit 80 outputs the low-level control signal $CS_6$ to the solenoid 77d of the shut-off valve 77 to deactivate the solenoid 77d, and also outputs the control signal $CS_5$ corresponding to a pulse signal having a controllable pulse width and a controllable frequency. Thus, the shut-off valve 77 is held in the valve closed position (the first position indicated in FIG. 14), with the result that there is no supply of the pilot pressure $P_{P7}$ from the valve 77 to the valve 75. On the other hand, the duty-ratio controlled electromagnetic solenoid valve 76 generates the pilot pressure $P_{P6}$ based on the control signal $CS_5$ oscillating at a duty cycle which is determined by the control unit 80 depending on the wheel speed difference between the front and rear wheels. Thus, the clutch pressure regulating valve 73 generates the clutch pressure $P_C$ which pressure is proportional to the magnitude of the pilot pressure $P_{P6}$ at a predetermined proportional gain. Resultingly, the clutch pressure $P_C$ based on the magnitude of the pilot pressure $P_{P6}$ (based on the duty ratio), is supplied through the directional control valve 75 to the inlet/outlet port 8 of the transfer clutch 7. As explained above, in the same manner as the first embodiment, a portion of driving torque transmitted from the engine to the transfer 6 can be delivered to the front wheel side as well as the rear wheel side with a high response, so as to rapidly shift from the rear-wheel drive mode to the four-wheel drive mode and consequently to enhance a driving stability of the vehicle. For the purpose of transmission of a portion of braking torque applied to the rear wheels to the front wheels during deceleration slip occurring owing to quick braking, in case the transfer clutch is engaged, the clutch can be rapidly engaged by application of the stand-by pressure $P_S$ in the same manner as explained above. In this case, a portion of braking torque to be applied to the rear wheels can be rapidly transmitted to the front wheels during deceleration slip, whereby an anti-skid control performance can be enhanced.

In the system 70 of the sixth embodiment, since a relatively cheap 3-port, 2-position electromagnetic solenoid type pressure control valve 76 is controlled in accordance with a duty-ratio control of the control unit 80 and the duty-ratio controlled electromagnetic valve 76 is replaced with a widely known proportional electromagnetic solenoid type pressure control valve, which is controllable in proportion to a current value of an exciting current applied to its solenoid, the total cost of the system can be reduced. Additionally, since the secondary pressure $P_{P6}$ produced by the electromagnetic valve 76 can be more precisely regulated by way of the duty-ratio control, irrespective of changes in coefficient of viscosity of the working fluid present in the spool chamber of the valve 76, depending on cold and hot weathers, the system can provide a precise pressure value of the clutch pressure $P_C$ based on the pilot pressure $P_{P6}$. Since the shut-off valve 77 can receive a sufficient amount of working fluid having the predetermined line pressure $P_{L1}$ directly through the supply lines 70a and 70c though the shut-off valve 77 consumes a relatively great amount of working fluid, there are less fluctuations in the pilot pressure $P_4$ produced by the pilot valve 74, which fluctuations can occur owing to a large amount of working fluid fed to the shut-off valve 77. Such a greatly stable pilot pressure $P_4$ results in a precisely regulatable pilot pressure $P_{P6}$ produced by the valve 76. Accordingly, according to the system 70, the clutch pressure $P_C$ can be adjusted precisely. In the event that the control signals $CS_5$ and $CS_6$ are not output to the solenoid 76d of the duty-ratio controlled electromagnetic valve 76 and to the solenoid 77d of the shut-off valve 77, unpredictively due to failure in an electrical system of the control unit or the solenoid, the incoming pressure fed into the inlet/outlet port 8 is set at the stand-by pressure $P_S$ or less, whereby the vehicle is held at the rear-wheel drive mode. That is, the system 70 of the sixth embodiment has the same fail-safe function as the first to fifth embodiments explained previously.

As set forth above, the controlled fluid pressure can be properly supplied to the port 8 of the transfer clutch. On the other hand, when the transfer clutch is disengaged, the pressure in the clutch can be returned to the reservoir through a drain line (as indicated by a single-dashed line in FIGS. 4, 6, 8, 10, 12, and 13). For example, in the case of the system shown in FIG. 6, the pressure in the clutch is relieved from the port 8 through the ports 25B, 25P1, 25B1 and the drain line (indicated by the one-dotted line) to the reservoir.

As will be appreciated from the above, a hydraulic pressure supply system for a variable-torque transfer clutch according to the invention can execute a clutch pressure control of the transfer clutch with a high responsive and a high accuracy. Although the hydraulic pressure supply systems of the respective embodiments are applied in case of a transfer clutch of a four-wheel drive vehicle that operates at a rear-wheel drive mode as a usual drive mode, the pressure supply system of the present invention may be applied in case of a transfer clutch of a four-wheel drive vehicle that operates at a front-wheel drive mode as a usual drive mode.

While the foregoing is a description of the preferred embodiments of carrying out the invention, it will be understood that the invention is not limited to the particular embodiments shown and described herein, but that various changes and modifications may be made without departing from the scope or spirit of this invention as defined by the following claims.

What is claimed is:

1. A hydraulic pressure supply system for a variable torque transfer of a four-wheel drive vehicle in which a driving-torque distribution ratio between front and rear road wheels is varied by adjusting a clutch pressure applied to a variable torque clutch assembled in said transfer, said system comprising:

an oil pressure source supplying a pressurized working fluid into a hydraulic line;

pressure regulating valve means fluidly connected to said line, for decreasingly regulating said pressurized working fluid at a predetermined clutch pressure;

directional control valve means fluidly connected to said pressure regulating valve means, for directing said clutch pressure to said clutch; and electromagnetic valve means controlling said pressure regulating valve means and said directional control valve means, for selectively supplying one of a stand-by pressure and a clutch engaging pressure to said clutch, said stand-by pressure being slightly less than a predetermined pressure level at which said clutch starts to engage and said clutch engaging pressure at which said clutch is engaged.

2. A hydraulic pressure supply system for a variable torque transfer of a four-wheel drive vehicle in which a variable torque clutch assembled in said transfer is brought into a predetermined clutch engaging state by application of a predetermined clutch pressure to said clutch to transfer a driving torque produced by a driving torque source to front and rear road wheels at a predetermined distribution ratio of said driving torque, said system comprising:

an oil pressure source supplying a pressurized working fluid into a hydraulic line;

pressure regulating valve means fluidly connected to said line, for decreasingly regulating said pressurized working fluid at a predetermined stand-by pressure slightly less than a predetermined pressure level at which said clutch starts to engage, said pressure regulating valve means responsive to a first pilot pressure for regulating said pressurized working fluid at a clutch engaging pressure at which said clutch is engaged, said clutch engaging pressure being variable depending on a pressure level of said first pilot pressure;

directional control valve means fluidly connected to said pressure regulating valve means, and responsive to a second pilot pressure for selectively supplying one of said stand-by pressure and said clutch engaging pressure to said clutch; and electromagnetic valve means for controlling said clutch engaging pressure at a desired pressure level by applying said first pilot pressure to said pressure regulating valve means, and for controlling a valve position of said directional control valve means by applying said second pilot pressure thereto so that said clutch engaging pressure is supplied to said clutch in the presence of a requirement of engagement of said clutch and that said stand-by pressure is supplied to said clutch in the absence of said clutch engagement requirement.

3. The system as claimed in claim 2, wherein said directional control valve means includes a high-pressure preferential type shuttle valve that outputs a higher one of said stand-by pressure and said clutch engaging pressure.

4. A hydraulic pressure supply system for a variable torque transfer of a four-wheel drive vehicle in which a variable torque clutch assembled in said transfer is brought into a predetermined clutch engaging state by application of a predetermined clutch pressure to said clutch to transfer a driving torque produced by a driving torque source to front and rear road wheels at a predetermined distribution ratio of said driving torque, said system comprising:

an oil pressure source supplying a pressurized working fluid into a hydraulic line;

a first pressure regulating valve fluidly connected to said line, for decreasingly regulating said pressurized working fluid at a predetermined stand-by pressure slightly less than a predetermined pressure level at which said clutch starts to engage;

a second pressure regulating valve fluidly connected to said line, and responsive to a first pilot pressure for decreasingly regulating said pressurized working fluid at a clutch engaging pressure at which said clutch is engaged, said clutch engaging pressure being variable at a predetermined proportional gain in accordance with an increase in said first pilot pressure;

a directional control valve fluidly connected to said first and second pressure regulating valves, and responsive to said first pilot pressure and to a second pilot pressure for selectively supplying one of said stand-by pressure and said clutch engaging pressure to said clutch;

a proportional electromagnetic pressure control valve for controlling said clutch engaging pressure in proportion to a pressure level of said first pilot pressure by applying said first pilot pressure to said second pressure regulating valve, and for shifting a valve position of said directional control valve, by application of said first pilot pressure thereto, to a first position at which said stand-by pressure is fed to said clutch; and an electromagnetic shut-off valve for shifting a valve position of said directional control valve, by application of said second pilot pressure thereto, to a second position at which said clutch engaging pressure is fed to said clutch.

5. A hydraulic pressure supply system for a variable torque transfer of a four-wheel drive vehicle in which a variable torque clutch assembled in said transfer is brought into a predetermined clutch engaging state by application of a predetermined clutch pressure to said clutch to transfer a driving torque produced by a driving torque source to front and rear road wheels at a predetermined distribution ratio of said driving torque, said system comprising:

an oil pressure source supplying a pressurized working fluid into a hydraulic line;

a pressure regulating valve fluidly connected to said line, and responsive to at least two pilot pressures for decreasingly regulating said pressurized working fluid in a stepwise manner so as to produce a predetermined stand-by pressure in case of application of a selected one of said pilot pressures thereto, and to produce a stepwisely variable clutch engaging pressure greater than said stand-by pressure depending on a combination of said pilot pressures applied to said pressure regulating valve, said stand-by pressure being slightly less than a predetermined pressure level at which said clutch starts to engage, said clutch engaging pressure being set at a predetermined pressure level at which said clutch is engaged;

a directional control valve fluidly connected to said pressure regulating valve, for supplying the incoming fluid pressure regulated by said pressure regulating valve to said clutch by shifting its valve position to a full open position when receiving at least one of said pilot pressures; and at least two electromagnetic shut-off valves fluidly connected to said line and arranged in parallel to each other, for controlling said clutch engaging pressure at a desired pressure level and for controlling a valve position of said directional control valve, by changing a combination of said pilot pressures to be applied to both said pressure regulating valve and said directional control valve.

6. The system as claimed in claim 5, which further comprises a shuttle valve having two inlet ports respectively connected to said shut-off valves and a sole outlet port connected to said directional control valve, for supplying a higher one of said pilot pressures output from the respective shut-off valves through said shuttle valve to said directional control valve to shift the valve position of said directional control valve to the full open position.

7. A hydraulic pressure supply system for a variable torque transfer of a four-wheel drive vehicle in which a variable torque clutch assembled in said transfer is brought into a predetermined clutch engaging state by application of a predetermined clutch pressure to said clutch to transfer a driving torque produced by a driving torque source to front and rear road wheels at a predetermined distribution ratio of said driving torque, said system comprising:

an oil pressure source supplying a pressurized working fluid into a hydraulic line;

a pressure regulating valve fluidly connected to said line, and responsive to first and second pilot pressures for decreasingly regulating said pressurized working fluid in a stepwise manner so as to produce a predetermined stand-by pressure in case of application of only said first pilot pressure thereto, to produce a predetermined first clutch engaging pressure greater than said stand-by pressure in case of application of only said second pilot pressure thereto, and to produce a predetermined second clutch engaging pressure greater than said first clutch engaging pressure in case of application of both said first and second pilot pressures thereto, said stand-by pressure being slightly less than a predetermined pressure level at which said clutch starts to engage, said first clutch engaging pressure being set at a predetermined pressure level at which said clutch is engaged softly, and said second clutch engaging pressure being set at a predetermined pressure level at which said clutch is engaged tightly;

a directional control valve fluidly connected to said pressure regulating valve, for supplying the incoming fluid pressure regulated by said pressure regulating valve to said clutch by shifting its valve position to a full open position when receiving at least one of said pilot pressures;

a first electromagnetic shut-off valve having an inlet port fluidly connected to said line and an outlet port fluidly connected to both said pressure regulating valve and said directional control valve, to output said first pilot pressure to the two valves when energized; and a second electromagnetic shut-off valve arranged in parallel with said first electromagnetic shut-off valve, to output said second pilot pressure to the two valves when energized, wherein said first and second electromagnetic shut-off valves are cooperative to each other, for controlling said clutch engaging pressure at a desired pressure level and for controlling a valve position of said directional control valve, by changing a combination of said pilot pressures to be applied to both said pressure regulating valve and said directional control valve.

8. A hydraulic pressure supply system for a variable torque transfer of a four-wheel drive vehicle in which a variable torque clutch assembled in said transfer is brought into a predetermined clutch engaging state by application of a predetermined clutch pressure to said clutch to transfer a driving torque produced by a driving torque source to front and rear road wheels at a predetermined distribution ratio of said driving torque, said system comprising:

an oil pressure source supplying a pressurized working fluid into a hydraulic line;

a first pressure regulating valve fluidly connected to said line, for decreasingly regulating said pressurized working fluid at a predetermined stand-by pressure slightly less than a predetermined pressure level at which said clutch starts to engage;

a second pressure regulating valve fluidly connected to said line, and responsive to at least two pilot pressures for decreasingly regulating said pressurized working fluid in a stepwise manner so as to produce a stepwisely variable clutch engaging pressure greater than said stand-by pressure depending on a combination of said pilot pressures applied to said second pressure regulating valve, said clutch engaging pressure being set at a predetermined pressure level at which said clutch is engaged;

a directional control valve fluidly connected to said first and second pressure regulating valves, and responsive to said pilot pressures for selectively supplying one of said stand-by pressure and said clutch engaging pressure to said clutch; and at least two electromagnetic shut-off valves fluidly connected to said line and arranged in parallel to each other, for controlling said clutch engaging pressure at a desired pressure level and for controlling a valve position of said directional control valve, by changing a combination of said pilot pressures to be applied to both said pressure regulating valve and said directional control valve.

9. A hydraulic pressure supply system for a variable torque transfer of a four-wheel drive vehicle in which a variable torque clutch assembled in said transfer is brought into a predetermined clutch engaging state by application of a predetermined clutch pressure to said clutch to transfer a driving torque produced by a driving torque source to front and rear road wheels at a predetermined distribution ratio of said driving torque, said system comprising:

a first reversible mechanical pump driven by an output shaft linked to said driving torque source for supplying a pressurized working fluid into a hydraulic line;

a second electric motor-driven pump for supplying a pressurized working fluid into said line;

a control unit generating a motor drive instruction for driving said second pump only when a fluid pressure produced by said first pump is less than a predetermined pressure level;

a line pressure regulating valve fluidly connected to said line, for regulating said pressurized working fluid at a predetermined line pressure;

a clutch pressure regulating valve fluidly disposed downstream of said line pressure regulating valve, for regulating said line pressure at a predetermined clutch pressure;

a directional control valve fluidly disposed downstream of said clutch pressure regulating valve, for directing said clutch pressure from said pressure regulating valve to said clutch in the presence of a requirement of application of said clutch pressure;

a duty-ratio controlled electromagnetic pressure control valve for controlling said clutch pressure depending on a predetermined duty ratio determined by said control unit; and an electromagnetic shut-off valve for controlling a valve position of said directional control valve in response to said requirement of application of said clutch pressure, wherein said clutch pressure is adjusted in case of said duty ratio of 0% at a predetermined stand-by pressure slightly less than a predetermined pressure level at which said clutch starts to engage, and in case of said duty ratio of 100% at a highest possible clutch engaging pressure at which said clutch is engaged tightly, wherein said clutch pressure being variable in proportion to said duty ratio.

10. A hydraulic pressure supply system for a variable torque transfer of a four-wheel drive vehicle in which a variable torque clutch assembled in said transfer is brought into a predetermined clutch engaging state by application of a predetermined clutch pressure to said clutch to transfer a driving torque produced by a driving torque source to front and rear road wheels at a predetermined distribution ratio of said driving torque, said system comprising:

a first reversible fluid pressure pump in a driven connection with a transmission output shaft of the vehicle for supplying a pressurized working fluid into a hydraulic line;

a second electric motor-driven single directional-flow fluid pressure pump for supplying a pressurized working fluid into said line;

a control unit generating a motor drive instruction for driving said second pump only when a fluid pressure produced by said first pump is less than a predetermined pressure level;

a line pressure regulating valve fluidly connected to said line, for regulating said pressurized working fluid at a predetermined line pressure;

a clutch pressure regulating valve fluidly disposed downstream of said line pressure regulating valve, and responsive to a first pilot pressure for regulating said line pressure, so that, in the absence of application of said first pilot pressure thereto, said line pressure is regulated at a predetermined stand-by pressure slightly less than a predetermined pressure level at which said clutch starts to engage, and that, in the presence of application of said first pilot pressure thereto, said line pressure is regulated at a clutch engaging pressure at which said clutch is engaged, said clutch engaging pressure being variable depending on said first pilot pressure;

a directional control valve fluidly disposed downstream of said clutch pressure regulating valve, and responsive to a second pilot pressure for supplying the regulated fluid pressure from said pressure regulating valve to said clutch in the absence of said second pilot pressure applied thereto;

a duty-ratio controlled electromagnetic pressure control valve for controlling said clutch engaging pressure in proportion to a pressure level of said first pilot pressure by applying said first pilot pressure to said clutch pressure regulating valve, the pressure level of said first pilot pressure being variable depending on a duty ratio of a control signal output from said control unit to said electromagnetic pressure control valve; and an electromagnetic shut-off valve for shifting a valve position of said directional control valve, by application of said second pilot pressure thereto, to a valve closed position at which a fluid communication between said pressure regulating valve and said clutch is blocked.

11. The system as claimed in claim 10, which further comprises a pilot valve fluidly downstream of said line pressure regulating valve for regulating said line pressure at a predetermined stable pilot pressure, said duty-ratio controlled electromagnetic pressure control valve receiving said stable pilot pressure as a primary pressure and adjusting said stable pilot pressure to the first pilot pressure, which is varied in proportion to said duty ratio.

12. The system as claimed in claim 11, wherein said clutch pressure regulating valve regulates said line pressure so that a secondary pressure of said clutch pressure regulating valve is set at said stand-by pressure in case of said duty ratio of 0% and set at a maximum clutch engaging pressure essentially equivalent to said line pressure in case of said duty ratio of 100%.

13. The system as claimed in claim 12, wherein said clutch pressure regulating valve comprises an internal-and-external pilot type pressure regulating valve which has an internal pilot port receiving a secondary pressure of said clutch pressure regulating valve, an external-pilot port receiving said first pilot pressure, and a return spring, said secondary pressure fed to said internal pilot port acting in a reverse direction against said spring, and said first pilot pressure fed to said external pilot port acting in a same direction as a bias of said spring.

14. The system as claimed in claim 13, wherein said duty-ratio controlled electromagnetic pressure control valve consists of a duty-ratio controlled 3-port, 2-position electromagnetic solenoid type pressure control valve having an inlet port, an outlet port and a drain port, ON and OFF states of a solenoid thereof are cyclically repeated according to said duty ratio based on a time allocation of the ON state in which said inlet port and said outlet port are communicated with each other to the OFF state in which said inlet port and said drain port are communicated with each other.

15. The system as claimed in claim 10, which further comprises an air bleed being formed in a clutch drum of said clutch, and a residual-air capturing chamber being defined between an annular stepped side wall section on a perimeter of a clutch piston of said clutch and an inner wall of said clutch drum, said residual-air capturing chamber being cooperative with said air bleed for extracting air contained in a working fluid present in a cylinder chamber of said clutch to atmosphere.

16. The system as claimed in claim 10, which further comprises bypass passage means fluidly disposed between an oil reservoir and a port of said first pump which port communicates said line, said bypass passage means having a bypass line and a one-way check valve disposed in said bypass line, for supplying a working fluid from said reservoir through said bypass line and said check valve to a suction side of said first pump, only when a reverse rotation of said first pump produces a vacuum on said suction side.

* * * * *